United States Patent [19]

Tanaka et al.

[11] Patent Number: 5,024,572
[45] Date of Patent: Jun. 18, 1991

[54] GOODS HANDLING METHOD AND APPARATUS THEREOF

[75] Inventors: Nobuhiro Tanaka, Miyashiro; Eiji Hirata, Koshigaya; Hideyuki Moriguchi, Miyashiro; Ko Azekura, Funabashi; Akira Tsubone, Kita Kyushu; Yasunori Ryu, Koga, all of Japan

[73] Assignees: Kao Corporation, Tokyo; Seibu Electric & Machinery Co., Ltd., Fukuoka, both of Japan

[21] Appl. No.: 464,679

[22] Filed: Jan. 8, 1990

Related U.S. Application Data

[60] Continuation of Ser. No. 184,091, Apr. 20, 1988, abandoned, which is a division of Ser. No. 886,241, Jul. 16, 1986.

[30] Foreign Application Priority Data

| Jul. 16, 1985 | [JP] | Japan | 60-156354 |
| Jul. 16, 1985 | [JP] | Japan | 60-156355 |
| Mar. 7, 1986 | [JP] | Japan | 61-49694 |
| Mar. 20, 1986 | [JP] | Japan | 61-60883 |
| Mar. 26, 1986 | [JP] | Japan | 61-67738 |
| May 13, 1986 | [JP] | Japan | 61-109253 |
| May 13, 1986 | [JP] | Japan | 61-109254 |

[51] Int. Cl.⁵ ............................................. B65G 65/00
[52] U.S. Cl. .................................. 414/276; 198/456; 198/592; 414/278; 414/273; B65G/65/00
[58] Field of Search ............ 198/456, 482; 414/266, 414/267, 268, 269, 270, 271, 272, 273, 274, 276, 275, 277, 278, 279, 280, 281, 282, 283, 284, 285, 286, 609, 673, 610, 612, 615, 617

[56] References Cited

U.S. PATENT DOCUMENTS

| 2,827,999 | 3/1958 | Raynor | 198/456 X |
| 3,379,321 | 4/1968 | Weir | |
| 3,398,842 | 8/1968 | Schickle | |
| 3,528,566 | 9/1970 | Weir | |
| 3,621,972 | 11/1971 | Reuter | 198/456 |
| 3,682,331 | 8/1972 | Fetherston | 198/592 X |
| 3,687,312 | 8/1972 | Weir | |
| 3,734,311 | 5/1973 | Thompson et al. | 414/273 |
| 3,750,804 | 8/1973 | Lemelson | 414/276 |
| 4,133,436 | 1/1979 | Dahm | 198/592 X |
| 4,239,436 | 12/1980 | Wildenaur | 414/278 X |
| 4,284,186 | 8/1981 | Brouwer | 198/456 X |
| 4,529,081 | 7/1985 | Tanaka | |
| 4,621,745 | 11/1986 | Grace | 414/276 X |

FOREIGN PATENT DOCUMENTS

| 2407756 | 8/1975 | Fed. Rep. of Germany | 414/278 |
| 1524149 | 4/1968 | France | |
| 55-186339 | 12/1940 | Japan | |
| 41-59555 | 9/1966 | Japan | |
| 43-94197 | 10/1968 | Japan | |

(List continued on next page.)

OTHER PUBLICATIONS

Patent Abstracts of Japan (unexamined), vol. 6, No. 130 (M-143) (1008) Abstract No. 57-57 103 (Sanki Kogyo K.K.).

Primary Examiner—Frank E. Werner
Attorney, Agent, or Firm—Birch, Stewart, Kolasch & Birch

[57] ABSTRACT

A goods handling apparatus for carrying in or carrying out goods with respect to storage facilities having multirow and multistage storing spaces. The apparatus includes a goods inlet apparatus or a goods outlet apparatus. The goods inlet apparatus or the goods outlet apparatus travels in the vertical direction and in the horizontal direction along the storing spaces of the goods storage facilities, conveying the goods within a plane parallel to a travelling plane of the goods inlet or the goods outlet apparatus, and transferring the goods, in a consecutive manner, from the goods conveying step to the goods inlet step, or from the goods outlet step to the goods conveying step by absorbing a difference between a goods inlet height or a goods outlet height in the goods inlet step or the goods outlet step and a goods conveyance height in the goods conveying step.

4 Claims, 26 Drawing Sheets

FOREIGN PATENT DOCUMENTS

| | | |
|---|---|---|
| 45-86254 | 9/1970 | Japan . |
| 49-21762 | 2/1974 | Japan . |
| 50-19516 | 1/1975 | Japan . |
| 50-170788 | 12/1975 | Japan . |
| 52-40947 | 4/1977 | Japan . |
| 55-130401 | 10/1980 | Japan . |
| 56-82435 | 5/1981 | Japan . |
| 57-92421 | 9/1982 | Japan . |
| 57-133817 | 9/1982 | Japan . |
| 57-145717 | 9/1982 | Japan . |
| 59-12005 | 1/1984 | Japan . |
| 59-118603 | 7/1984 | Japan . |
| 59-182104 | 10/1984 | Japan . |
| 59-207304 | 11/1984 | Japan . |
| 60-188207 | 9/1985 | Japan . |
| 60-248503 | 12/1985 | Japan . |
| 1035237 | 7/1966 | United Kingdom . |
| 1327728 | 8/1973 | United Kingdom . |
| 2174686 | 11/1986 | United Kingdom . |

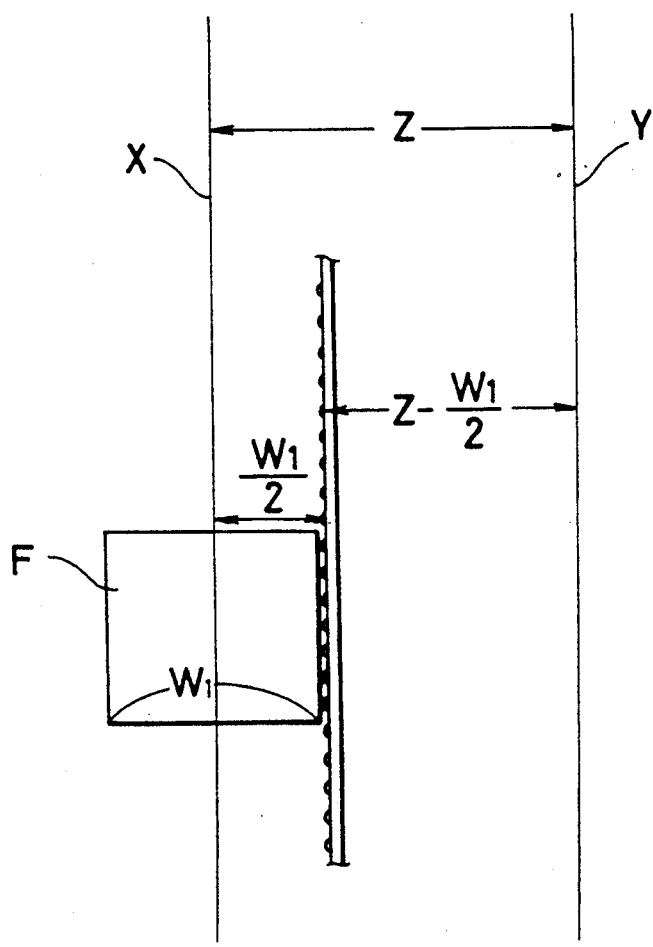

FIG. 18(A)
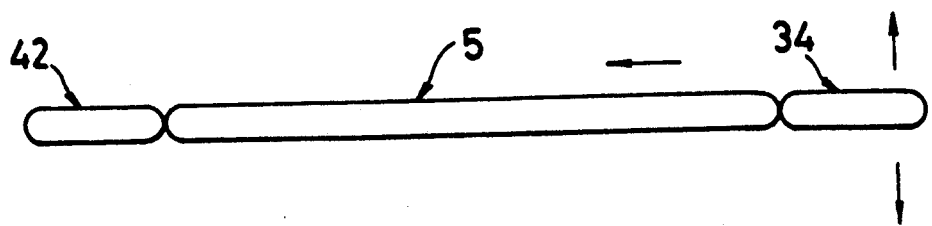
FIG. 18(B)
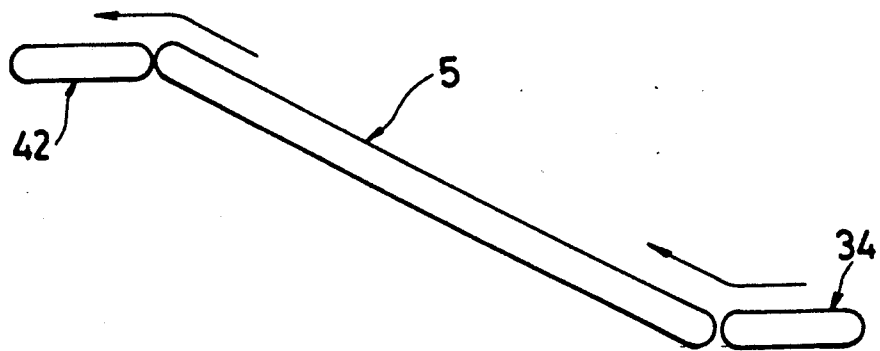
FIG. 18(C)
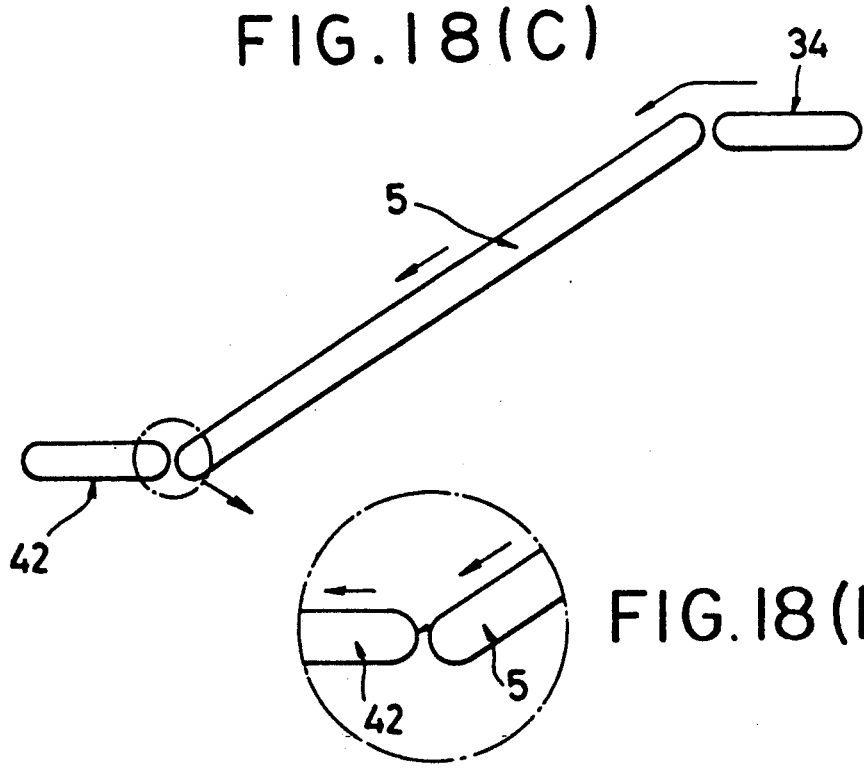
FIG. 18(D)

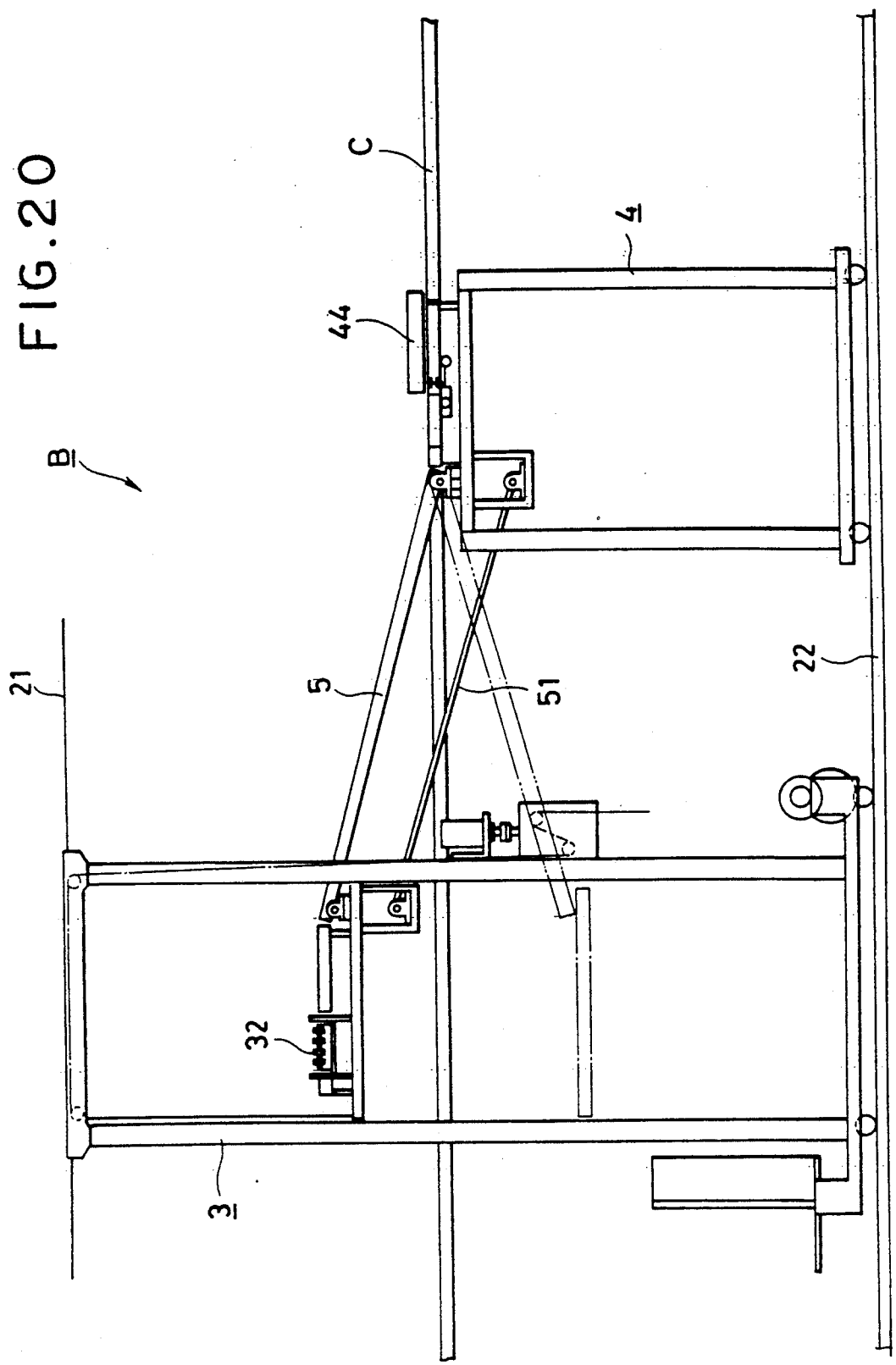

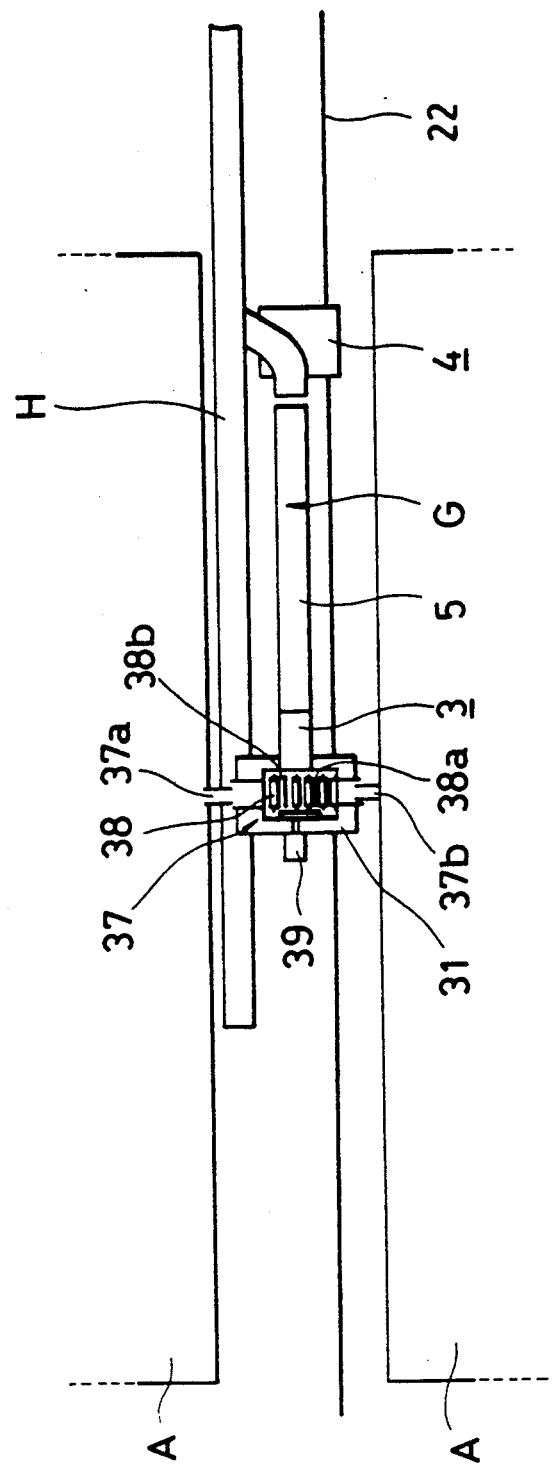

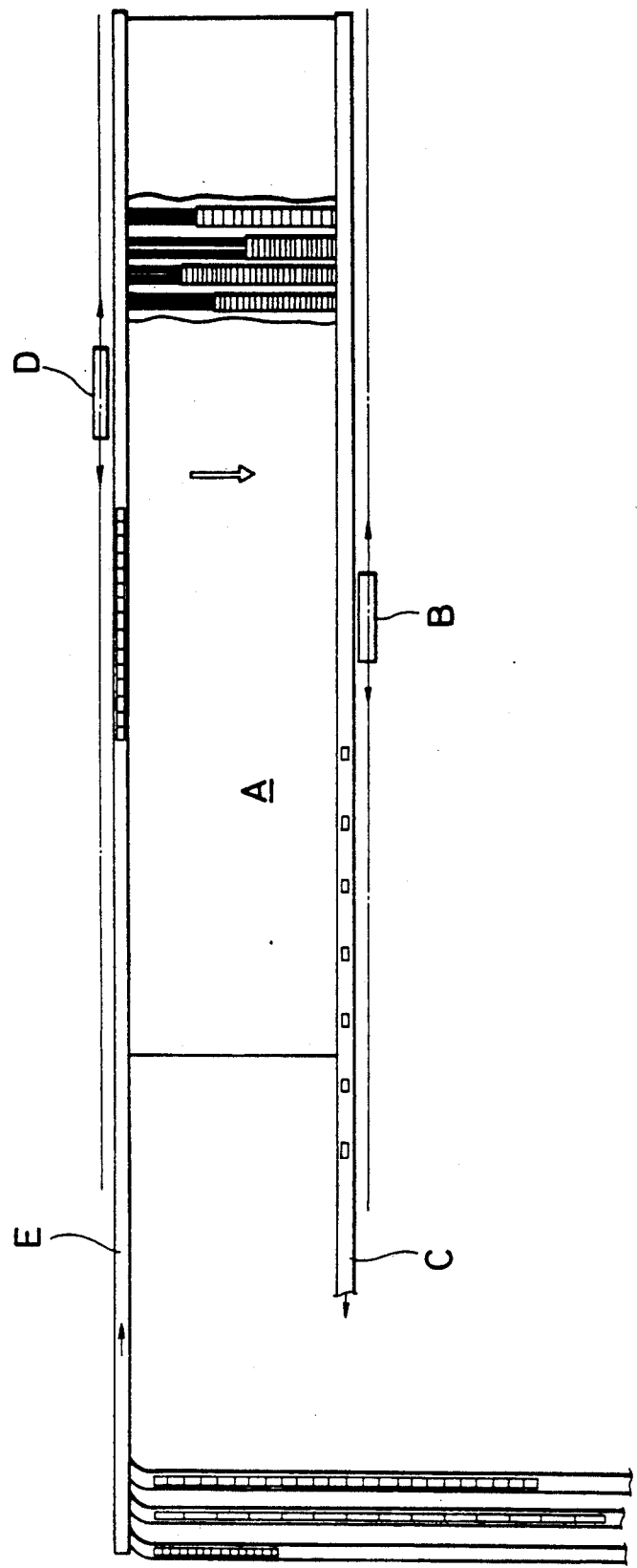

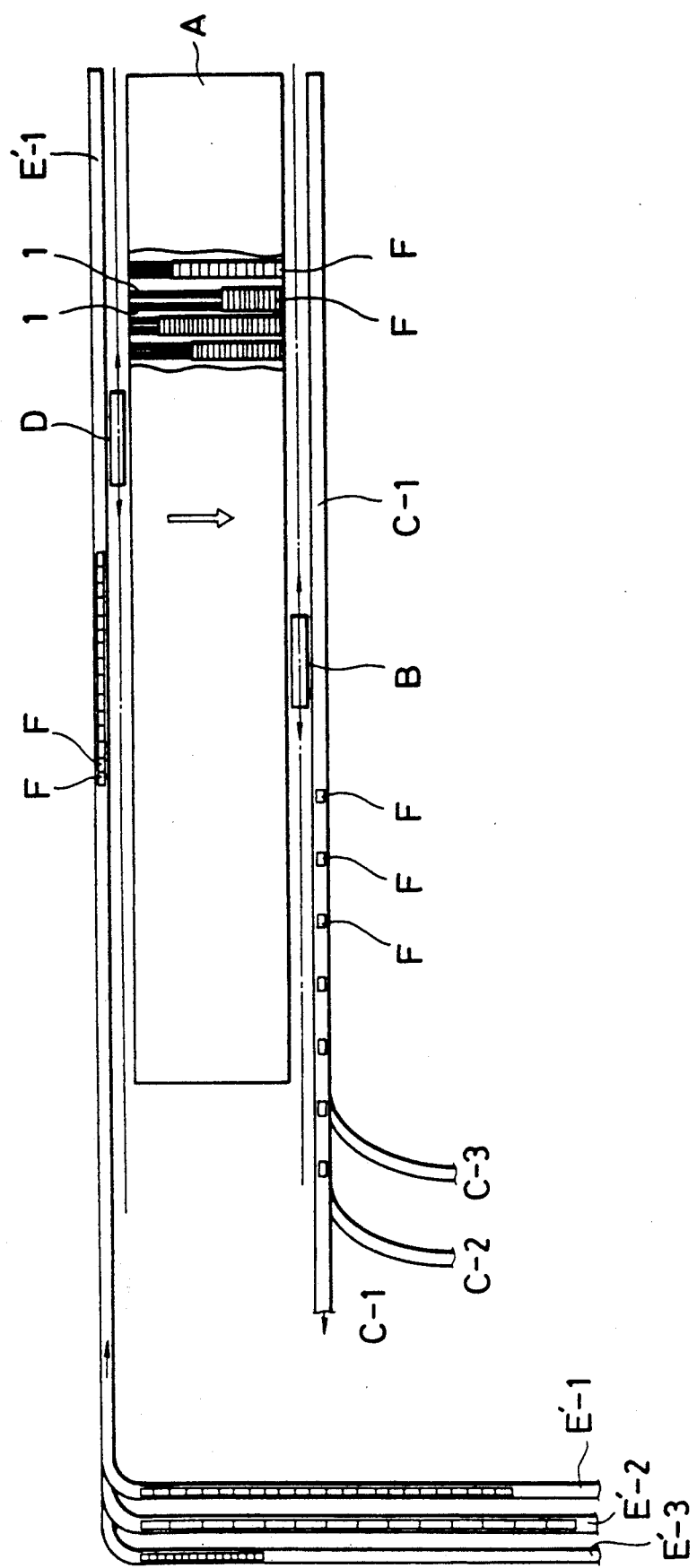

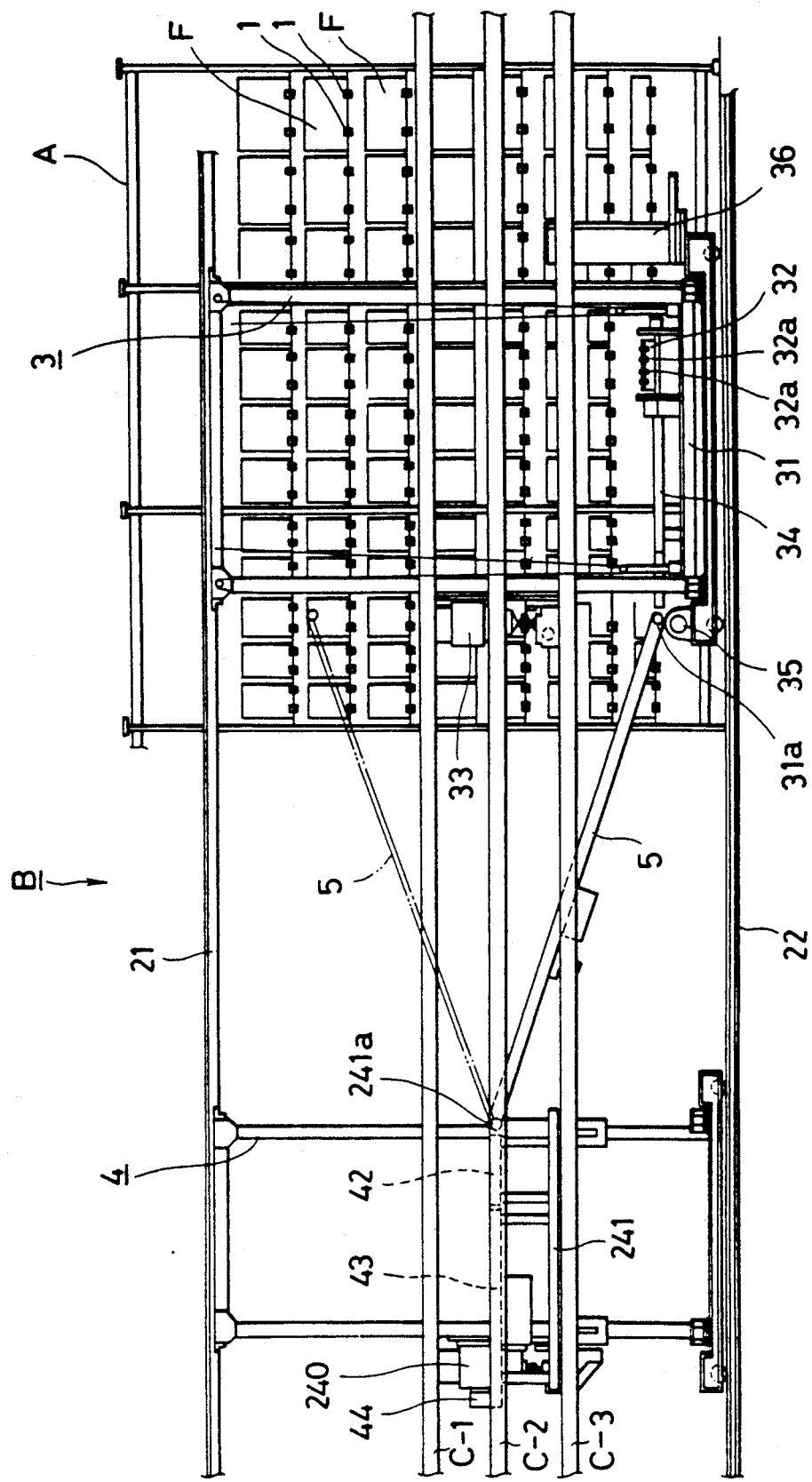

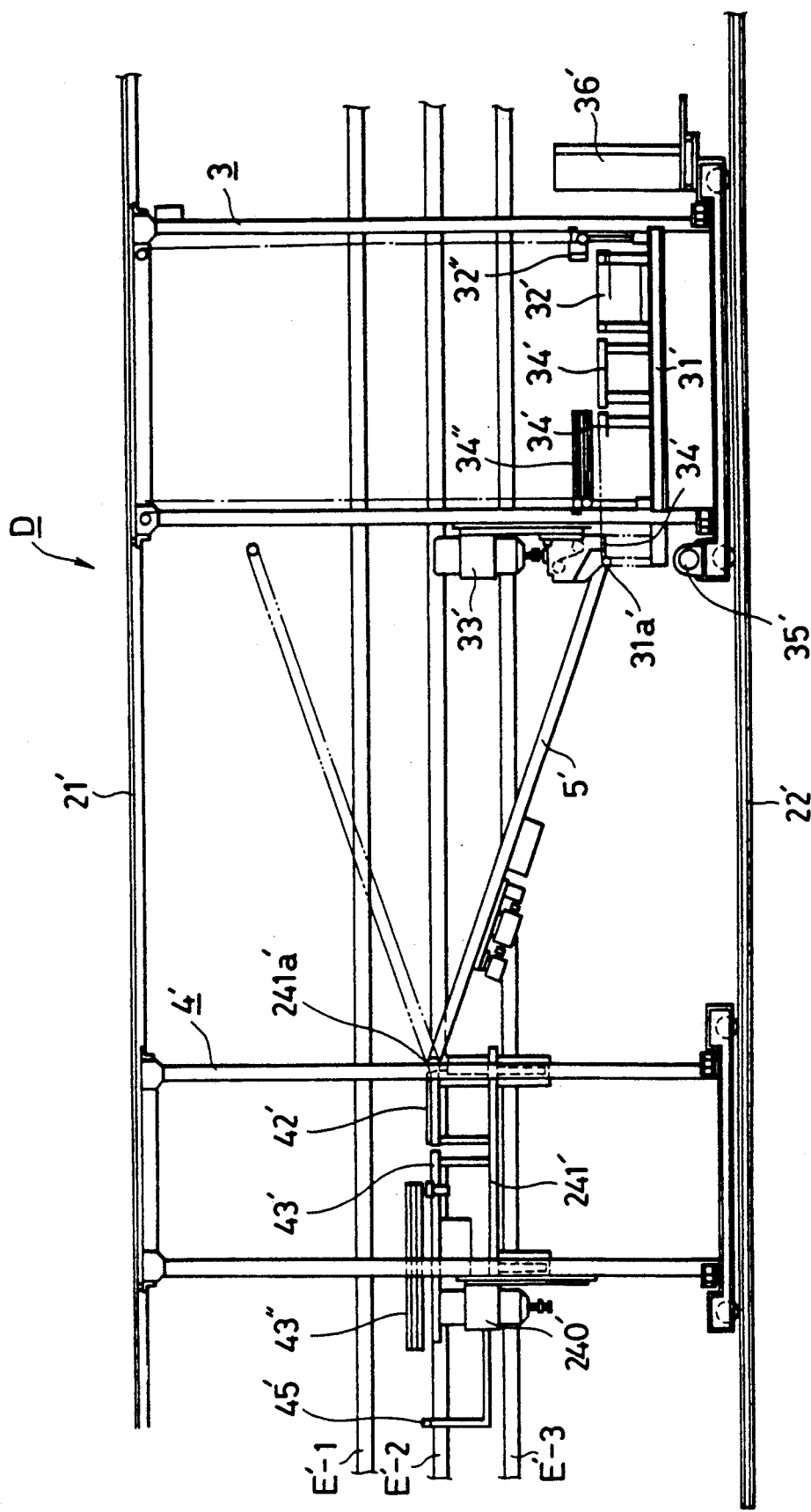

GOODS HANDLING METHOD AND APPARATUS THEREOF

This application is a continuation of application Ser. No. 07/184,091 filed on April 20, 1988, now abandoned, which is a divisional of Ser. No. 06/886,241 filed on July 16, 1986.

BACKGROUND OF THE INVENTION

1. Field of the Invention

The present invention relates to a goods handling method and an apparatus thereof which can efficiently, promptly and successively effect an inlet and an outlet of goods with respect to storage facilities.

2. Description of the Prior Art

Examples of prior art devices relating to methods and apparatuses for carrying in and carrying out goods to storage facilities are provided in Japanese Patent Application Early Laid-open Publication No. 59(1984)-12005 (U.S. Pat. No. 4,529,081), Japanese Patent Application Early Laid-open Publication No. 59(1984)-118603, Japanese Patent Application Early Laid-open Publication No. 59(1984)-182104, Japanese Utility Model Publication No. 47(1972)-33170, Japanese Utility Model Publication No. 56(1981)-4650, Japanese Utility Model Application Early Laid-open Publication No. 50(1975)-113178, and Japanese Utility Model Application Early Laid-Open Publication No. 59(1984)-37206.

The above-mentioned official publications will be described. The Japanese Patent Application Early Laid-open Publication No. 59-12005 teaches that casings accummulated on an accummulation conveyor are transferred as a lot unit onto a feed conveyor.

Similarly, the Japanese Patent Application Early Laid-open Publication No. 59-118603 teaches that multifrontage and multistage lattice-type shelves are combined with a lifting apparatus and a carrier conveyor.

The Japanese Patent Application Early Laid-open Publication No. 59-182104 teaches that a picking warehouse equipment comprises a vertical circulation conveyor.

Similarly, the Japanese Utility Model Publication No. 47-33170 teaches an apparatus for distributing goods in the vertical direction by using a conveyor which can be freely varied its vertical direction inclination angles. That is, this Official Publication discloses a carrier device, wherein an inclination conveyor (tilt conveyor) is disposed onto one inclination carrier passage connecting the height of the lowermost stage goods inlet place and the uppermost goods inlet place in such a manner as to continuously extend. The respective conveyors are provided such that they are vertically oscillated about the inlet side end portions, thereby to selectively connect the outlet side end portions of the respective conveyors which are disposed onto the aforementioned passage to the goods inlet place.

The Japanese Utility Model Publication No. 56-4650 teaches that a travelling and lifting stacker crane and an expandable frame, which expands and oscillates according to the travelling and lifting of the stacker crane, are combined. That is, the Official Publication discloses a carrier device comprising a sprocket pivotally attached to an out-release place in the vicinity of one end from which a travelling and lifting stacker crane starts travelling and a terminal end where the stacker crane stops travelling, a driven sprocket pivotally attached to a step of a load table, and an endless belt bridged over to the sprocket.

The Japanese Early Laid-open Utility Model Application Publication No. 50-113178 teaches an inching capable elevator inching in the vertical direction disposed at angles.

The Japanese Early Laid-open Utility Model Application Publication No. 59-37206 discloses that a tilt conveyor is oscillated integrally with lifting of a goods delivery device. That is, the Official Publication discloses a carrier device comprising a transfer device having a liftable delivery device, and a tilt conveyor disposed opposite to the transfer device, an oscillation idling end of the tilt conveyor being connected to the delivery device side.

However, the conventional goods handling processes and apparatuses as mentioned above have the following problems.

That is, although the device taught by the Official Publication of the Japanese Patent Application Early Laid-open No. 59-12005 can promptly and efficiently feed casings, an extremely large crane main body is required.

Similarly, since the device taught by the Japanese Patent Application Early Laid-open Publication No. 59-118603 comprises a feed conveyor including an oscillation frame and a horizontal stationary frame which are integrally formed by means of one belt looped therearound, particularly when it is brought to be opposite to tall storage facilities, the gradient or inclination of the oscillation frame must be decided within a gradient level in which goods do not fall according to the height of the uppermost stage shelf. Accordingly, the oscillation frame must be prepared to be extremely long in length. As a result, an installation space of the storage facilities is required to be so large as the width of bay of the storage facilities plus the length of the oscillation frame. Thus, an extremely large amount of dead space is produced.

Likewise, although the device taught by the Japanese Patent Application Early Laid-open Publication No. 59-182104 can reduce the size of the crane main body and the dead space can be minimized, each of the goods is required to be timely transferred onto a goods receiving portion of the vertical circulation conveyor. Thus, a complicated control system is required. Nevertheless, the carrier capacity is limited.

Japanese Utility Model Publication No. 47-33170 does not describe anything about the concept that goods are automatically carried in or carried out from storage facilities. Since the apparatus described in the Japanese Utility Model Publication No. 47-33170 or the Japanese Utility Model Publication No. 56-4650 has a tilt conveyor, a goods outlet end of which is not positioned lower than a goods inlet end of the tilt conveyor, the goods cannot be transferred lower than the goods inlet end of the tilt conveyor. When it is applied to, for example, a carrier device for carrying in or carrying out the goods with respect to the storage facilities, a dead space is produced at a lower portion of the storage facilities.

Likewise, in the art taught by the Japanese Utility Model Publication No. 56-4650, particularly when it is brought to be opposite to tall storage facilities, the gradient or inclination of an expandable frame must be decided within a gradient level in which goods do not fall according to the height of the uppermost stage shelf. Accordingly, the expandable frame is required to be made extremely long. As a result, the out-release place must be located at an extremely far place from the end portion of the storage facilities. Thus, an extremely large dead space is produced.

In the device taught by Japanese Utility Model Application Early Laid-open Publication No. 50-113178, goods cannot be handled in a consecutive manner.

In the art taught by the Japanese Utility Model Application Early Laid-open Publication No. 59-37206, since the transfer device is not provided with a travelling function, the structure of the storage facilities is limited. In addition, although a slide type conveyor is connected through a pin joint provided at an oscillation idling end of the tilt conveyor and leveling between the tilt conveyor and the slide type conveyor is not necessary, since the structures of the tilt conveyor and the movable conveyor (slide type conveyor) are limited and the respective conveyors cannot be used as independent conveyors, there involve such inconveniences that the tilt conveyor and the slide type conveyor cannot be independently actuated and controlled.

Further, in a carrier device comprising a tilt conveyor and a movable conveyor provided to at least one end side of the tilt conveyor, in order to carry goods lower than the goods inlet end of the tilt conveyor, it is conceivable that the good outlet end of the tilt conveyor is made movable lower than the goods inlet end of the tilt conveyor. However, in this case, in a connecting area of the goods outlet end portion of the tilt conveyor set in a falling gradient state and the movable conveyor, an extension plane of the conveyor plane of the tilt conveyor directs a downward level than the conveyor plane of the movable conveyor, due to, for example, that the extension plane of the conveyor plane of the tilt conveyor collides against a pulley corresponding portion of the movable conveyor, there involves such inconveniences that the tilt conveyor cannot surely and smoothly transfer the carrying goods to the movable conveyor side.

Similarly, in the goods handling apparatus described in the Japanese Patent Application Early Laid-open Publication No. 59-12005, the Japanese Patent Application Early Laid-open Publication No. 59-182104 and the Japanese Utility Model Application Early laid-open Publication No. 50-113178, since no tilt conveyor is provided, when goods are transferred between the storage section of each stage of the storage facilities and the outlet or the inlet conveyor with respect to the storage facilities, the goods must be vertically moved by some means and then the empty means must be vertically moved prior to the following transfer step. Accordingly, the goods cannot be efficiently, promptly and successively in or out with respect to the storage facilities.

On the other hand, in the goods handling apparatuses disclosed in the Japanese Patent Application Early Laid-open Publication No. 59-118,603, Japanese Utility Model Publication No. 47-33170, Japanese Utility Model Publication No. 56-4650 and Japanese Utility Model Application Early Laid-open Publication No. 59-37206, since a tilt conveyor is provided, the above-mentioned problems are not encountered. However, in the goods handling apparatuses disclosed in these Official Publications, the goods storage capable heights of storage portions at each stage of the storage facilities are the same. Moreover, there is no description nor suggestion in these Official Publications about whether goods having different sizes or bulks are stored with respect to the storage portions at each stage. Accordingly, when goods having a comparatively high center of gravity (tall goods) are conveyed by the tilt conveyor in its extremely inclined state, there involves such problems that the goods easily fall during conveyance.

Further, one example of the prior art related to a goods centering apparatus is disclosed in the Japanese Patent Publication No. 61(1986)-4722. Furthermore, one example of the related art to such an apparatus is disclosed in Japanese Patent Application Early Laid-open Publication No. 57(1982)-145717.

The prior art disclosed in the above-mentioned Official Publications will be described. In the Japanese Patent Publication No. 61-4722, there is described an apparatus, wherein a goods guide (side guide plate) is reciprocally movably provided with respect to a truck, and while the truck loaded with goods held in the state that the goods guide projects toward the truck side runs toward a goods guide position, or the truck loaded with goods held in the state that the goods guide withdrawn runs toward the goods guide position, the goods guide is caused to be projected to perform the centering of the goods.

Further, in the Japanese Patent application Early Laid-open Publication No. 57-145717, there is disclosed an alignment apparatus, wherein at least a part of the rollers of a roller conveyor comprising a plurality of rollers are provided at angles with respect to the perpendicular direction to a goods guide and the sides of the goods are corrected to the goods guide position.

However, the above-mentioned prior art related to the centering of the goods involves the following problems.

That is, the apparatus disclosed in the Japanese Patent Publication No. 61-4722 cannot control the reciprocally moving quantity of the goods guide. Accordingly, although this apparatus is suitably applicable to goods having a certain size (width), it cannot perform the centering of various kinds of goods having different sizes per every size. In addition, since the conveyance of the goods is effected not only by truck but also by roller arranged on the truck in such a manner as to laterally transfer the goods in the direction perpendicular to the running direction of the truck, the structure thereof is complicated.

Further, the apparatus disclosed in the Japanese Patent Application Early Laid-open Publication No. 57-145717 is intended to align the goods by a stationary guide with reference to the side of the goods. Accordingly, this apparatus can perform the centering of goods having a certain size or fixed size but it cannot perform the centering of various kinds of goods having different sizes according to the respective sizes.

Furthermore, in a goods handling method, wherein goods fed to a plurality of goods feed conveyors according to, for example, the kinds of goods, are merged onto a goods carrier conveyor, and by causing a goods intake apparatus (warehousing apparatus) to travel in the generally parallel direction with respect to the goods carrier conveyor toward a desired intake position (warehousing position), for example, the respective storage section (storing space) in storage facilities, the goods which are being conveyed by the the goods carrier conveyor are intaken into the intake position according to, for example, the kinds of the goods, the goods merging order among the above-mentioned goods feed conveyors is usually decided by the following three methods:

(1) First-come-first-serve basis, i.e., the order of goods which arrives first at the head (the downstream end) of the goods feed conveyor;

(2) Feed finishing order, i.e., the order that a goods feeding onto the goods feed conveyor is finished first; and (3) Fixed order, i.e., a predetermined order.

However, the above-mentioned conventional methods of goods ordering among the goods feed conveyors have the following inconveniences.

That is, regarding the first-come-first-serve basis and the feed finishing order, there is, in general, no rules between the goods merging order and the goods intaken order to the intake position. Accordingly, the intake apparatus is often reciprocally travelled between different intake-positions. Due to the foregoing, much time is wasted for travelling the intake apparatus. Thus, intake performance is reduced.

Further, regarding the fixed order, if the goods are not fed to the goods feed conveyor in the predetermined order due to trouble of upstream facilities, for example, a depalletizer, of the goods feed conveyor, intake losses are produced timewise.

Furthermore, gravity flow racks used for warehouse, etc. are usually are designed such that loaded goods are transferred toward the outlet side by utilizing the gravity thereof. In order to prevent the conveyance speed from becoming unnecessarily large due to acceleration caused by gravity of the goods, it is known that a brake apparatus is provided as described in the Japanese Utility Model Publication No. 61(1986)-1130 and Japanese Patent Application Early Laid-open Publication No. 60(1985)-248503. That is, the Japanese Utility Model Publication No. 61-1130 teaches a brake apparatus, wherein a friction force is produced between goods and a roller by the roller inclined the axis thereof with respect to the conveyance direction, thereby to control the speed of goods. Similarly, the Japanese Patent Application Early Laid-open Publication No. 60-248503 teaches a brake apparatus, wherein a brake shoe block is lifted on a roller and the goods are caused to climb thereon to control the speed of the goods.

Furthermore, since the conveyance speed of goods does not become too high in a gravity flow rack having a comparatively short depth (the conveyance direction of goods), it is known that a goods holding piece is fixed to an end portion of an outlet port side as disclosed in the Japanese Patent Application Early Laid-open Publication No. 57(1982)-19205. That is, the Japanese Patent Application Early Laid-open Publication No. 57-19205 teaches a wall (goods holding piece) generally vertically disposed to a lower portion of an outlet port side of a gravity flow rack which conveys and stores the goods in a lateral posture.

Furthermore, in a gravity flow rack, there is known a conveyor as disclosed in the Japanese Patent Application Early Laid-open Publication No. 60(1985)-188207, wherein a few goods are left on the downstream side of an inclined conveyor so as not to permit the goods to collide at a goods holding piece at the downstream side, thereby to prevent the falling and dropping of the goods.

However, although the apparatuses disclosed in the Japanese Utility Model Publication No. 61-1130 and the Japanese Patent Application Early Laid-open Publication No. 60-248503 are applicable to a gravity flow rack having storing spaces of multirows and multistages, it is not effective unless a brake apparatus is provided to each and all of the storing spaces, which invites a large cost increase. In addition, since the actuating state of the brake apparatus must be always controlled to maintain it in a constant conveyance state, a large expense is required for maintenance thereof.

Furthermore, the apparatus disclosed in the Japanese Patent Application Early Laid-open Publication No. 57-19205 has such problems that if the center of gravity of goods is high, or the depth of a gravity flow rack is long (if the depth is long, storage capable quantity can be enlarged which unnecessitates a frequent feeding of the goods), the goods carried in from the outlet port side often fall down or are dropped when the goods are carried therein. This is especially true when no goods are stored yet.

Furthermore, in the method disclosed by the Japanese Patent Application Early Laid-open Publication No. 60-188207, since the goods are fed in the state that at least one goods is already stored on the gravity flow rack, the goods which were carried in do not fall and are not dropped. However, under the situation that no goods are stored on the gravity flow rack, there involves the same problems as the afore-mentioned Japanese Patent Application Early Laid-open Publication No. 57-19205.

Examples of known picking apparatuses are disclosed in the Japanese Patent Publication No. 47(1972)-28868, Japanese Patent Publication No. 49(1974)-41304, Japanese Patent Application Early Laid-open Publication No. 50(1975)-117178, Japanese Utility Model Application Early Laid-open Publication No. 52(1977)-83187, Japanese Patent Application Early Laid-open Publication No. 57(1982)-92421 (U.S. patent application Ser. No. 495,127 filed on May 16, 1983), Japanese Patent Application Early Laid-open Publication No. 59(1984)-207304, etc.

SUMMARY OF THE INVENTION

It is therefore a first object of the present invention to provide a goods handling method and an apparatus thereof, wherein no dead spaces are produced in the vicinity of storage facilities and goods can be efficiently, promptly and successively handled.

A second object of the present invention is to provide a goods handling method and an apparatus thereof, wherein various kinds of goods having different sizes can be handled by centering according to the respective sizes thereof.

A third object of the present invention is to provide a goods handling method and an apparatus thereof, wherein one end of a tilt conveyor from where goods are carried out can be positioned at a lower location than the other end of the tilt conveyor from where the goods are carried in, so that the goods can be conveyed downwardly lower than the goods inlet end of the tilt conveyor, the gradient of the tilt conveyor is made comparatively small without making the length of the tilt conveyor long, the structures of the tilt conveyor and a movable conveyor are such that they are independently controllable, and the goods can be surely and smoothly transferred in the area where the goods outlet end of the tilt conveyor and the movable conveyor are connected.

A fourth object of the present invention is to provide a goods handling method and an apparatus thereof, wherein goods can be efficiently, promptly and successively carried in or intaken with respect to goods storage facilities without receiving an adverse influence from upstream facilities.

A fifth object of the present invention is to provide a goods handling method and an apparatus thereof, wherein goods can be efficiently, promptly and successively carried in or carried out with respect to goods storage facilities without permitting the goods to fall down at the time when the goods are carried in or carried out.

A sixth object of the present invention is to provide a goods handling method and an apparatus thereof, wherein goods can be efficiently and safely carried in with respect to a gravity flow rack having a multirow and multistage storing spaces, particularly when the goods are first carried therein.

According to the present invention, the above-mentioned first object can be achieved by providing a goods handling method for carrying in or carrying out goods with respect to storage facilities having multirow and multistage storing spaces including the steps of carrying the goods into a goods inlet apparatus or carrying out the goods from a goods outlet apparatus by causing the goods inlet apparatus or the goods outlet apparatus to travel in the vertical direction and in the horizontal direction along the the storing spaces of the goods storage facilities, conveying the goods within a plane parallel to a travelling plane of the goods inlet or the goods outlet apparatus, and transferring the goods, in a consecutive manner, from the goods conveying step to the goods inlet step, or from the goods outlet step to the goods conveying step by absorbing a difference between a goods inlet height or a goods outlet height in the goods inlet step or the goods outlet step and a goods conveyance height in the goods conveying step.

Further, according to the present invention, the above-mentioned first object can be achieved by providing a goods handling apparatus for carrying in or carrying out goods with respect to storage facilities having multirow and multistage spaces including a goods inlet apparatus or a goods outlet apparatus adapted to carry in or carry out goods by travelling in the vertical direction and in the horizontal direction along the storing spaces of the storage facilities, a goods carrier conveyor adapted to convey the goods within a plane parallel to a travelling plane of the goods inlet apparatus or the goods outlet apparatus, and a goods transfer conveyor adapted to connect the goods inlet or the goods outlet apparatus to the goods carrier conveyor, the inlet or the outlet apparatus being placed on a lifting section of a stacker crane which is caused to travel in the horizontal direction along the storing space of the storage facilities, the goods transfer conveyor being oscillatably mounted to the stacker crane according to the lifting of the lifting section, while being supported one end thereof by the lifting section and the other end thereof at the same height of the goods carrier conveyor.

The above-mentioned first object, other object and advantages of the present invention will be readily confirmed by the following detailed description of the preferred embodiments, when taken in conjunction with the accompanying drawings.

BRIEF DESCRIPTION OF THE DRAWINGS

FIG. 13 is a schematic view for explaining a centering mode of the goods inlet apparatus according to one embodiment of the present invention;

FIG. 18 (A), (B), (C) and (D) are pictorial views showing actuation states of the important portion of FIG. 3;

FIG. 20 is a rear view of another outlet side apparatus;

FIG. 21 is a plan view schematically showing a goods handling apparatus according to another embodiment of the present invention;

FIG. 22 is a plan view schematically showing a further embodiment of the present invention;

FIG. 28 is a plan view schematically showing a goods handling apparatus according to yet a further embodiment of the present invention;

FIG. 29 is a front view showing an outlet side apparatus of a goods handling apparatus according to an additional embodiment of the present invention; and FIG. 30 is a rear view of an inlet side apparatus of a goods handling apparatus according to a further additional embodiment of the present invention.

DETAILED DESCRIPTION OF THE PREFERRED EMBODIMENTS

First of all, a goods handling apparatus according to one embodiment of the present invention will be described hereunder with reference to the accompanying drawings.

Figure 1:
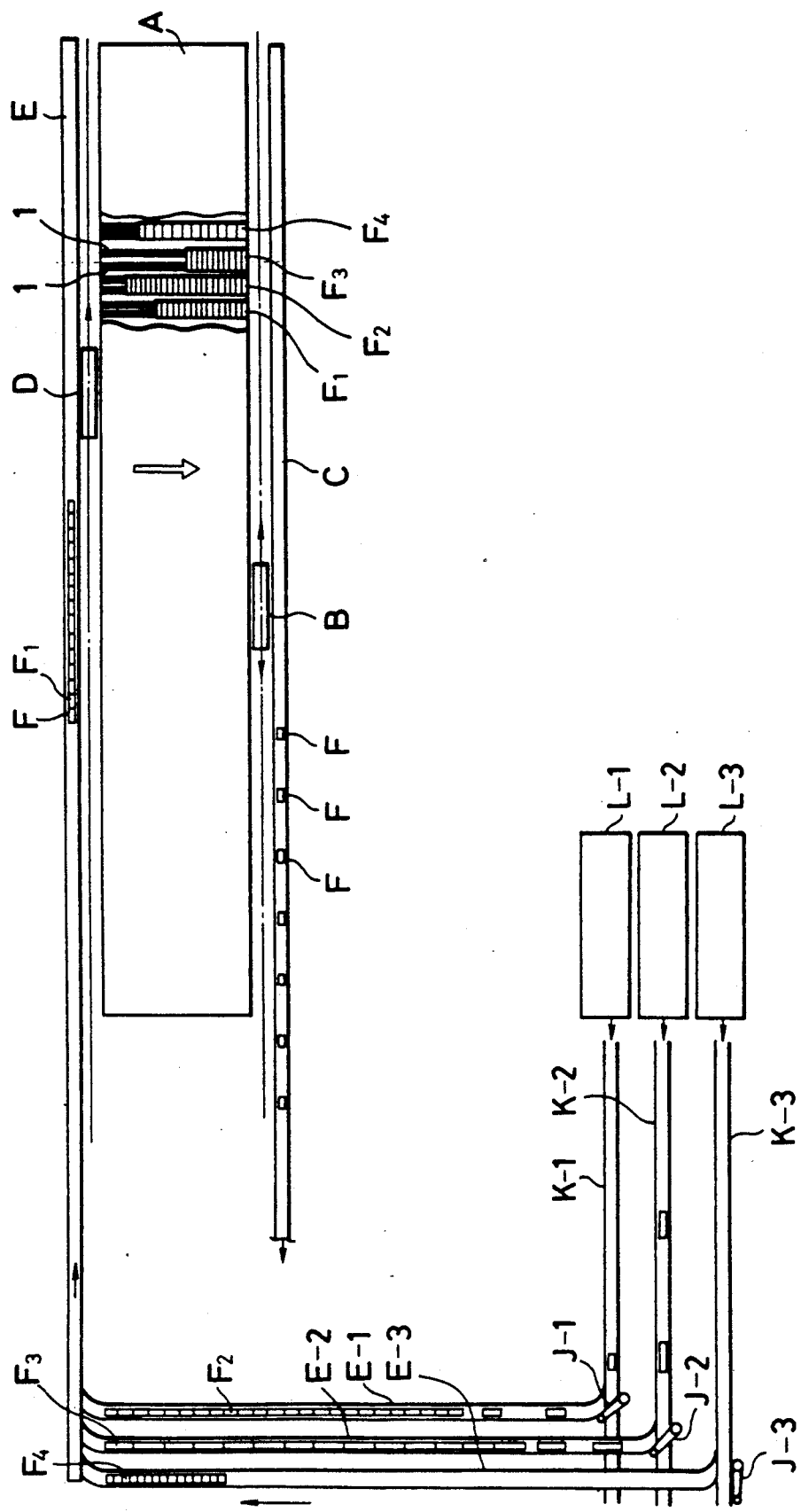
FIG. 1 is a plan view schematically showing a goods handling apparatus according to one embodiment of the present invention.

FIG. 1 illustrates a schematic plan view of a goods handling apparatus of the present invention, wherein, reference character A denotes storage facilities having a multirow and multistage storing space (storage portion), B denotes a goods outlet apparatus (hereinafter referred to as an outlet side stacker crane) which is caused to travel in the horizontal direction along a storing space at an outlet side of the storage facilities A, C denotes an outlet side goods carrier conveyor (hereinafter referred to as a goods outlet conveyor) disposed at an outer side of the travelling plane of the stacker crane B, D denotes a goods inlet apparatus (hereinafter referred to as an inlet side stacker crane) which is caused to travel in the horizontal direction along the inlet side storing space of the storage facilities A, E denotes an inlet side goods carrier conveyor (hereinafter referred to as a goods inlet conveyor) disposed at an outer side of the travelling plane of the stacker crane D, E-1, E-2 and E-3 denote goods feed conveyors (hereinafter referred to as storage lines or storage conveyors) for feeding goods F, F, ... to the goods inlet conveyor E, J-1, J-2 and J-3 denote gate apparatuses for taking into the storage lines E-1, E-2 and E-3 a predetermined number of goods from the forward lines K-1, K-2 and K-3 as neccessary, L-1, L-2 and L-3 denote depalletizers for depalletizing palletized goods and carrying out onto the forward lines K-1, K-2 and K-3. The goods handling apparatus according to this embodiment is generally constructed as such that the goods F, F, ... carried out from the respective depalletizers L-1, L-2 and L-3 to the respective forward lines K-1, K-2 and K-3 according to kinds thereof are fed to the respective storage lines E-1, E-2 and E-3 through the respective gate apparatuses J-1, J-2 and J-3, the goods F, F, ... stored on the respective storage lines E-1, E-2 and E-3 according to the kinds are allotted with desired merging orders merging to the goods inlet conveyor E according to the kinds thereof, the goods F, F, ... allotted with the merging orders are fed to the goods inlet conveyor E, the goods F, F, ... being conveyed by the goods inlet conveyor E are taken into a predetermined storing space of the storage facilities through the inlet side stacker crane D waiting at a predetermined intake-position or inlet position and at the same time, the goods F, F, ... within the storage facilities A are forwarded by the outlet side stacker crane B, so that the goods F, F, ... are carried out by the goods outlet conveyor C.

Figure 3:
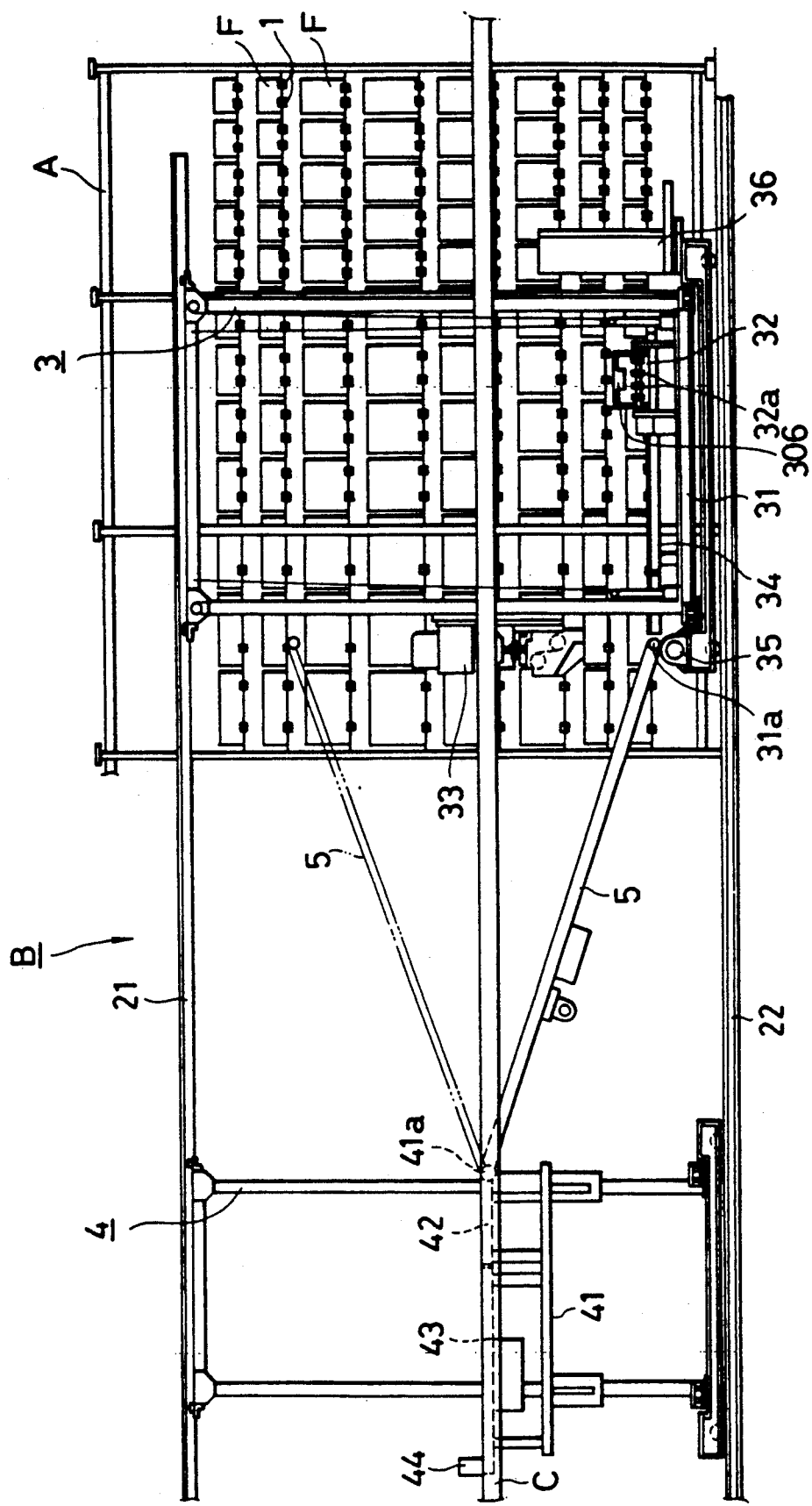
Figure 6:
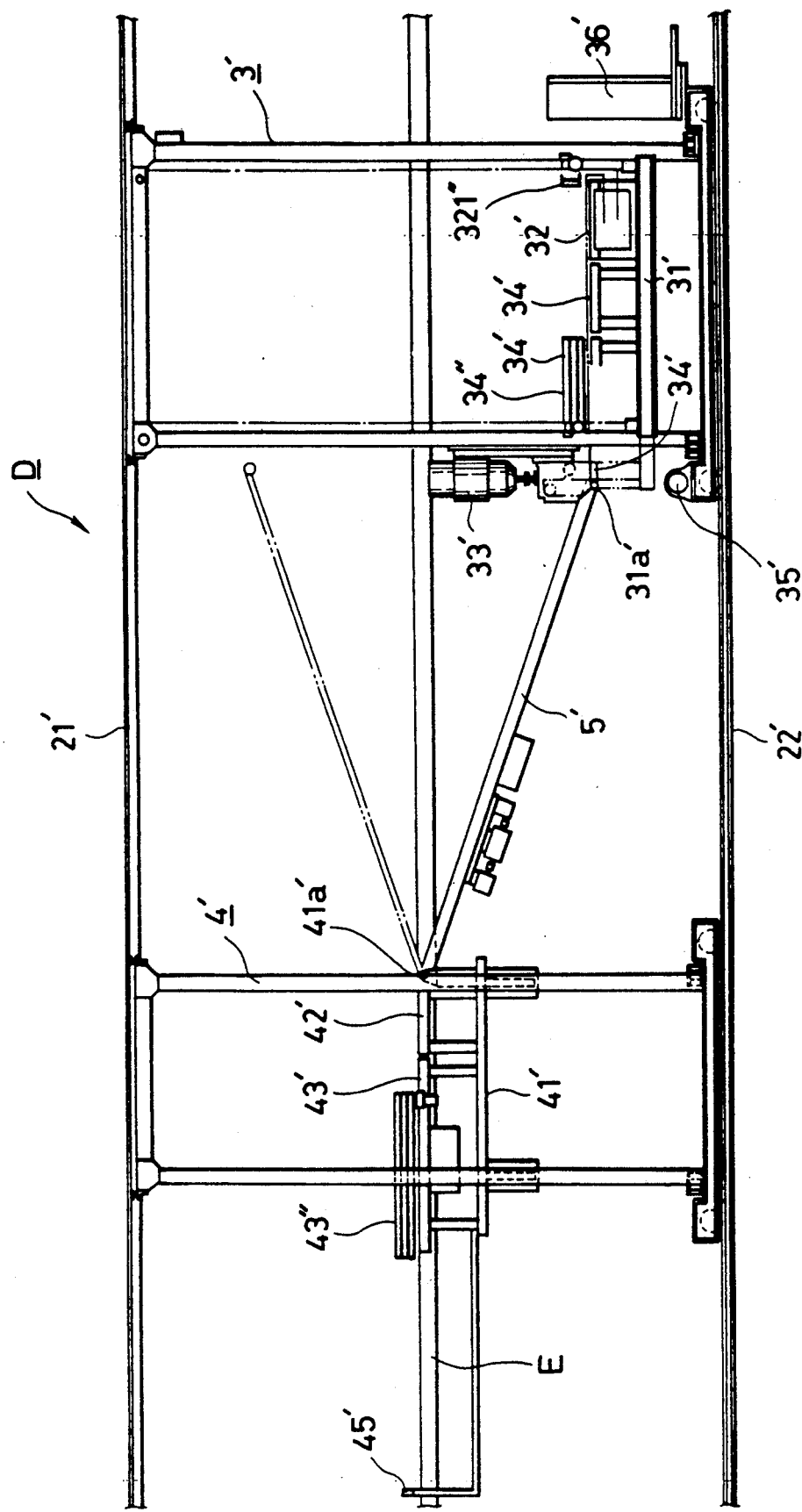

The respective component parts employed in the embodiment will be described. The goods outlet conveyor C and the goods inlet conveyor E, as respectively shown in FIG. 1, FIG. 3 and FIG. 6, are located in outer positions of the travelling plane of the outlet side stacker crane B and the inlet side stacker crane D and generally horizontally disposed at a height in the vicinity of a storing space of a central stage of the storage facilities A. The goods inlet conveyor E is permitted to convey the goods F, F, ... fed from the storage lines E-1, E-2 and E-3 through suitable gates (not shown) to suitable positions.

Figure 2:
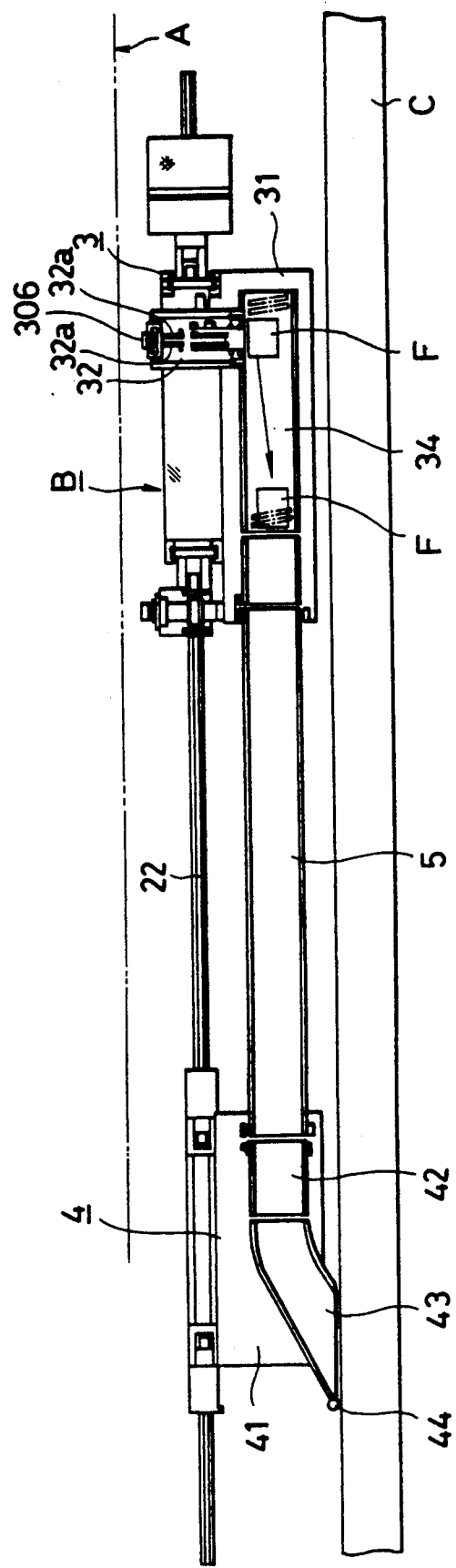
FIG. 2, FIG. 3 and FIG. 4 respectively are a plan view, a front view and a side view of an outlet side apparatus of a goods handling apparatus according to one embodiment of the present invention.
Figure 4:
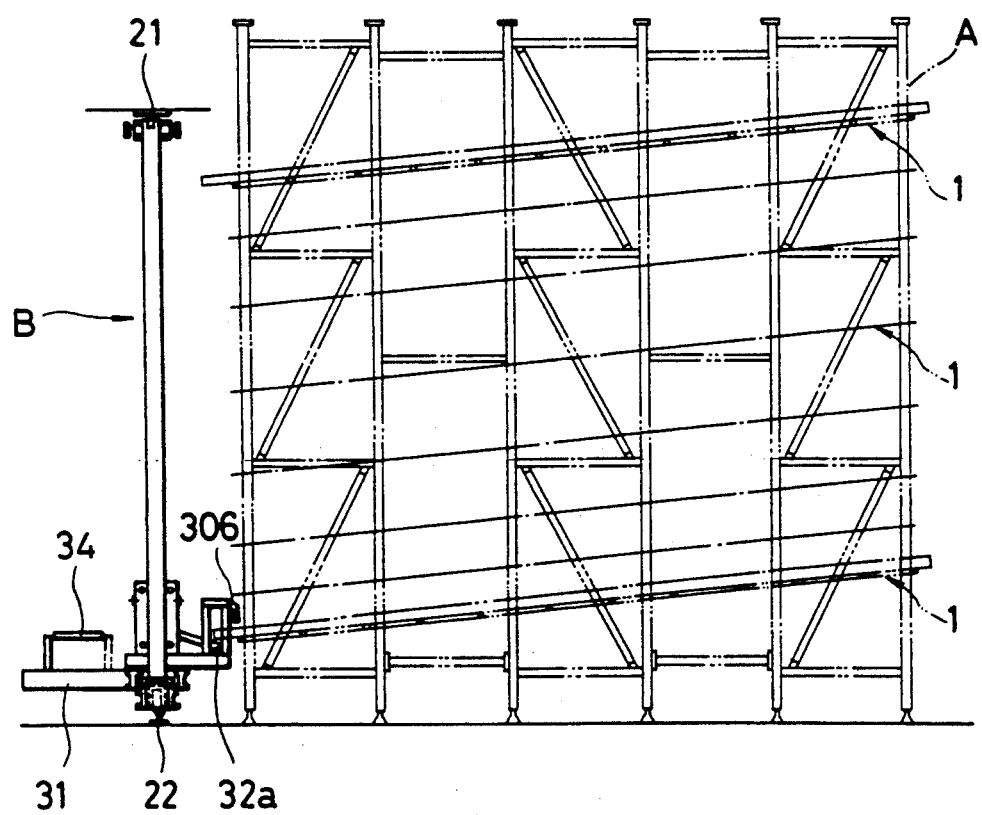

The outlet side stacker crane B, as shown in FIG. 2, FIG. 3 and FIG. 4, chiefly comprises a crane main body 3 supported by upper and lower rails 21 and 22 and adapted to travel in the horizontal direction along the outlet side storing space of the storage facilities A, a truck 4 supported by likewise the upper and the lower rails 21 and 22 and adapted to travel in the horizontal direction along the outlet side storing space of the storage facilities A following after the crane main body 3, and a goods transfer conveyor (tilt conveyor) 5 adapted to connect the crane main body 3 and the truck 4, a lifting section 31 mounted to the crane main body 3 being placed with a goods outlet apparatus 32 (liftable transfer apparatus) so that the goods outlet apparatus 32 is caused to vertically and horizontally travel along the storing space of the storage facilities A by the travelling of the crane main body 3 and the vertical movement of the lifting section 31, the goods F, F, ... being taken out from a desired storing space by the goods outlet apparatus 32 and carried out onto the goods outlet conveyor C through the goods transfer conveyor 5.

The outlet side stacker crane B will be described in detail with reference to FIG. 2, FIG. 3 and FIG. 4. The lifting section 31 in the crane main body 3 is liftably mounted in the crane main body 3 by a lift actuation apparatus 33. Placed on the lifting section 31 are the goods outlet apparatus 32 and a roller conveyor 34 adapted to transfer the goods F, F, ... taken out from the storage facilities A by the goods outlet apparatus 32 onto the goods transfer conveyor 5. The goods outlet apparatus 32 employed in this embodiment is a picking apparatus as described in Japanese Patent Application Early Laid-open Publication No. 59(1984)-207304 including a pair of expandable oscillation conveyors 32a which enter between the front end portions of the pair of rail frames 1, 1 of the storage facilities A and take out the goods F, F, ... from the storage facilities A. Although a roller of the roller conveyor 34 may be disposed perpendicular to the conveying direction of the goods, the roller is disposed at angles in this embodiment. Due to the foregoing arrangement, the goods F transferred from the goods outlet apparatus 32 are conveyed in the direction as shown by an arrow in FIG. 2. At the time when the goods F are transferred from the roller conveyor 34 onto the goods transfer conveyor 5, the goods F are positioned at a generally central portion of the roller conveyor 34.

Figure 8:
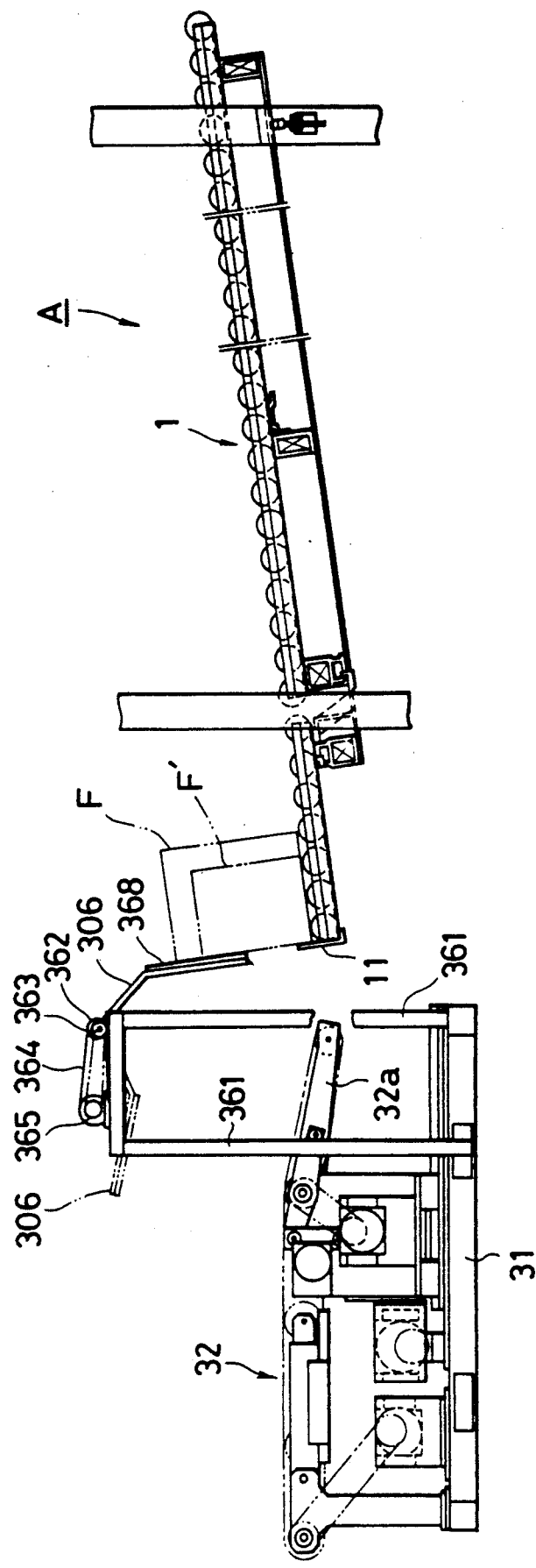
FIG. 8 is an enlarged right side view showing an important portion of the outlet side apparatus according to one embodiment of the present invention.
Figure 9:
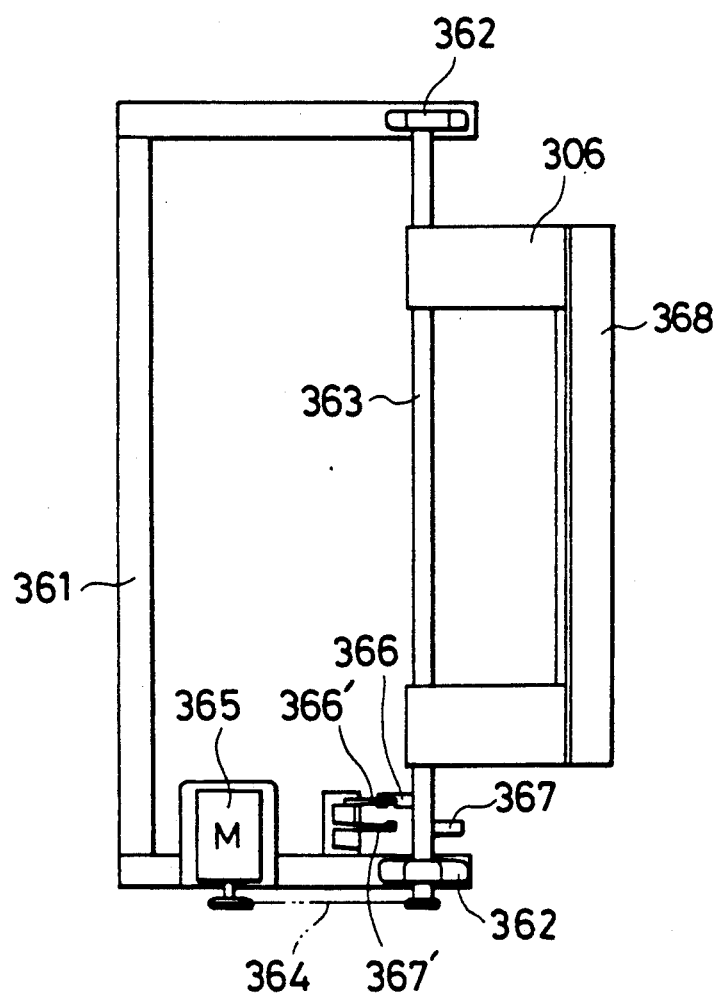
FIG. 9 is an enlarged plan view of the important portion of FIG. 8.

On the lifting section 31, a stopper 306 is also placed as shown in detail in FIG. 8 and FIG. 9. The stopper 306 is fixed to a pivot shaft 363 carried on bearings 362, 362 on both sides of an upper end of a frame 361 erected from the storage facilities A side of the lifting section 31 and oscillated between the solid line position (actuating state) and the virtual line position (released state) of FIG. 8 when the pivot shaft 363 is pivoted by a brake motor 365 through a chain 364. The stopper 306 is controlled as such that the stopper 306 is oscillated to the solid line position of FIG. 8 to receive or stop goods at the outlet side end portion of a predetermined empty storing space of a gravity flow rack A as the storage facilities before goods is carried into the empty storing space. The stopper 306 is also controlled as such that before the goods are carried out from the gravity flow rack A after the goods are carried therein for an initial supply, the stopper 306 is oscillated to the virtual line position of FIG. 8 in order not to interfere the goods carried out from the gravity flow rack A. The stopper 306 may be oscillated by using an air cylinder or the like. Further, in FIG. 9, reference numerals 366 and 366' respectively denote a bracket and a limit switch for detecting an actuated state of the stopper, and 367 and 367' respectively denote a bracket and a limit switch for detecting a released state of the stopper. Similarly, reference numeral 368 denotes a cushion member attached to the stopper.

In the goods handling apparatus according to the present invention, the goods can be simultaneously carried in and carried out, if the stopper and the goods outlet apparatus are mounted on separate stacker cranes so that they are independent with respect to each other. Further, a plurality of stacker cranes each including a stopper may be provided.

Also, the crane main body 3 is provided with a travel driving apparatus 35 adapted to cause the crane main body 3 to effect a self-travelling, a control apparatus 36 adapted to control the lifting section driving apparatus 33 and the travel driving apparatus 35 and the like.

The truck 4 in the outlet side stacker crane B is provided with a mounting portion 41. Disposed in order on the mounting portion 41 are a conveyor (a movable conveyor) 42 adapted to carry out the goods F from the goods transfer conveyor 5 onto the goods outlet conveyor C and a conveyor 43 having a warped configuration held in a position of the same height as that of the goods outlet conveyor C. A front end portion of the conveyor 43 is disposed adjacent to the marginal portions at the sides of the upper surface of the goods outlet conveyor C. One side of the front end portion is provided with a free guide roller 44 erected therefrom and adapted to smoothly discharge the goods F onto the goods outlet conveyor C.

Further, the goods transfer conveyor 5 in the outlet side stacker crane B is pivotably supported at one end thereof by a supporting point 31a of the lifting section 31 of the crane main body 3 and at the other end thereof by a supporting point 41a of the mounting portion 41 at the same height as that of the goods outlet conveyor C, so that the roller conveyor 34 of the crane main body 3 and the movable conveyor 42 of the truck 4 are connected with respect to each other. Accordingly, the goods transfer conveyor 5 has such functions that according to the lifting of the lifting section 31 of the crane main body 3, the goods transfer conveyor 5 transfers the goods F, F, . . . from the goods outlet apparatus 32 onto the goods outlet conveyor C at a downward pitch, a horizontal pitch or an upward pitch, while oscillating about the supporting point 41a of the truck 4 and draws the truck 4 while following the crane main body 3 travelling. The goods transfer conveyor 5 may be short in length in order to facilitate the oscillation.

Figure 5:
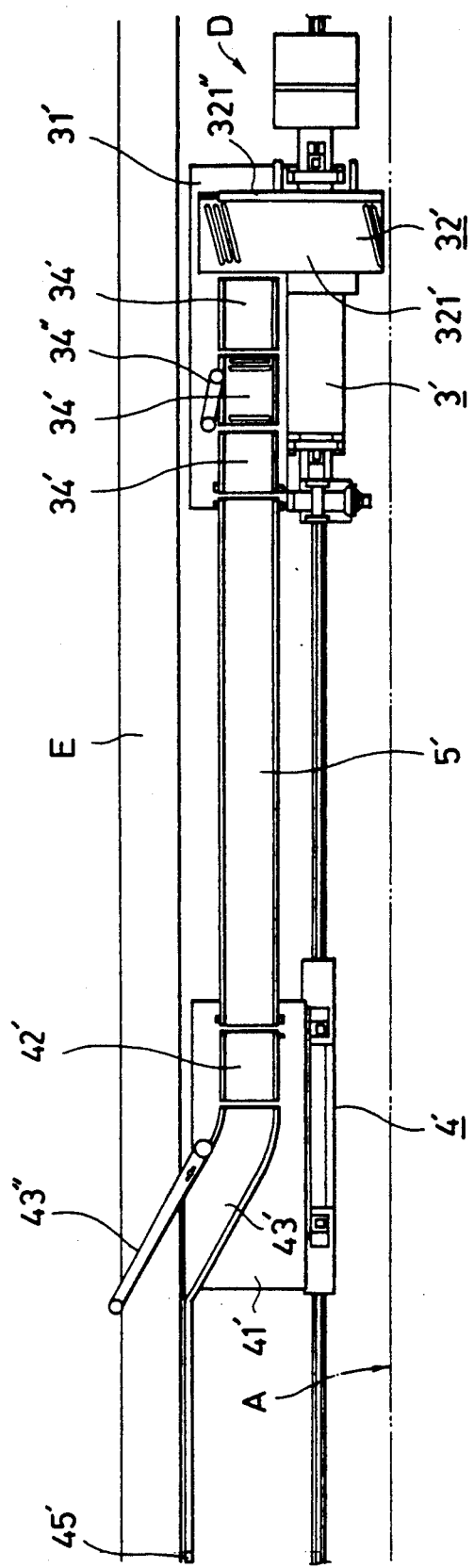
FIG. 5, FIG. 6 and FIG. 7 respectively are a plan view, a rear view and a side view of an inlet side apparatus of a goods handling apparatus according to one embodiment of the present invention.
Figure 7:
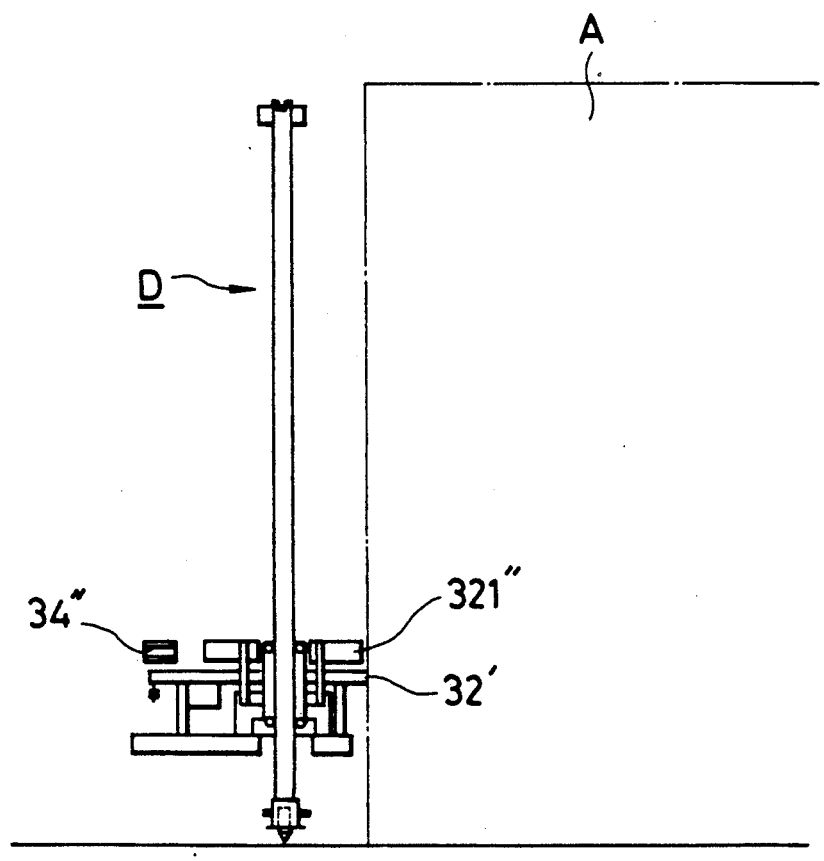

The inlet side stacker crane D is constituted generally in the same manner as the outlet side stacker crane B except that as shown in FIG. 5, FIG. 6 and FIG. 7, the goods outlet apparatus in the outlet side stacker crane B is replaced with the goods inlet apparatus and a minor change is applied to a small portion so that the goods can be properly carried in the storage facilities A from the goods inlet conveyor E.

That is, the inlet side stacker crane D chiefly comprises a crane main body 3' supported by upper and rails 21' and 22' and horizontally travelled along the inlet side storing space of the storage facilities A and a truck 4' following thereafter through a goods transfer conveyor (tilt conveyor) 5'. Due to the foregoing arrangement, the goods F, F, . . . of the goods inlet conveyor E can be fed to a desired storing space of the storage facilities A through a goods inlet apparatus 32' mounted on a lifting section 31' of the goods transfer conveyor 5' and the crane main body 3'.

The inlet side stacker crane D will be described in greater detail. On the lifting section 31' liftable by a driving apparatus 33' in the crane main body 3', roller conveyors 34', 34', 34' (the roller conveyor 34' adjacent to the goods transfer conveyor 5' is a movable conveyor), besides the goods inlet apparatus 32' (liftable transfer apparatus), adapted to transfer the goods F, F, . . . onto the goods inlet apparatus 32' from the goods transfer conveyor (tilt conveyor) 5' are linearly mounted. The goods inlet apparatus 32' employed in this embodiment is a feed apparatus (centering apparatus) comprising a roller conveyor 321' attached to a centering guide (goods guide) 321". A roller 322' of the goods inlet apparatus 32' is disposed at angles and the centering guide 321" thereof effects a centering of the good F to be fed to the storage facilities A at the central portion of the roller conveyor of the inlet apparatus by a power cylinder controlled by a computer according to sizes thereof. Further, the roller conveyors 34', 34', 34' adapted to transfer the goods from the goods transfer conveyor to the goods inlet apparatus 32' are disposed in such a manner as to intersect the goods inlet apparatus 32' at right angles, and the central roller conveyor 34' thereof is annexed with a conveyor 34" adapted to guide the goods fed from the goods transfer conveyor 5'. Further, the crane main body 3' includes a travel driving apparatus 35' adapted to cause the crane main body to effect a self-travelling, a control apparatus 36 adapted to control the lifting section driving apparatus 33' and the travel driving apparatus 35'.

Figure 10:
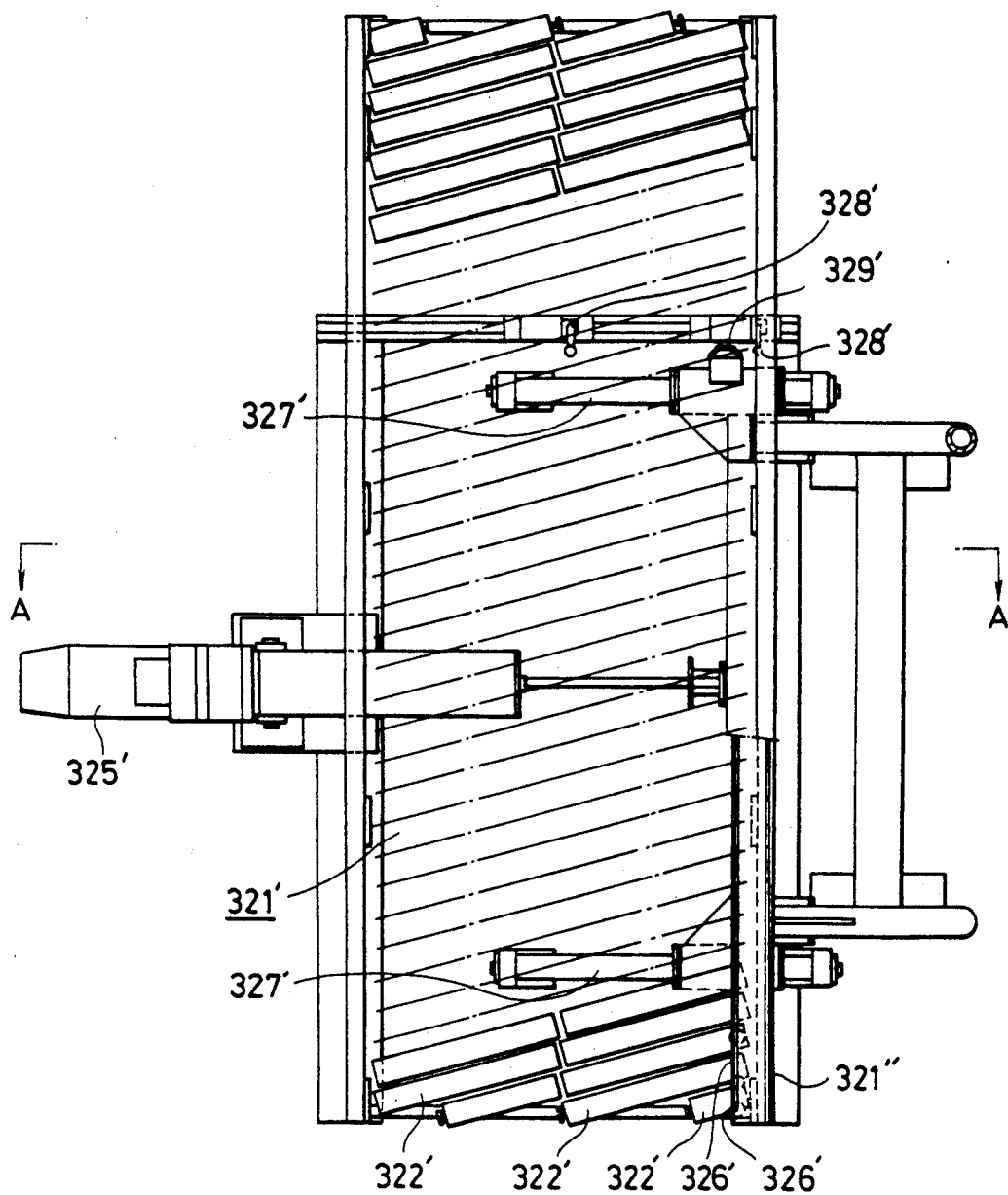
FIG. 10, FIG. 11 and FIG. 12 respectively are an enlarged plan view, an arrow view taken on line A—A of FIG. 10 and an enlarged left side view showing a goods inlet apparatus of a good handling apparatus according to one embodiment of the present invention.
Figure 11:
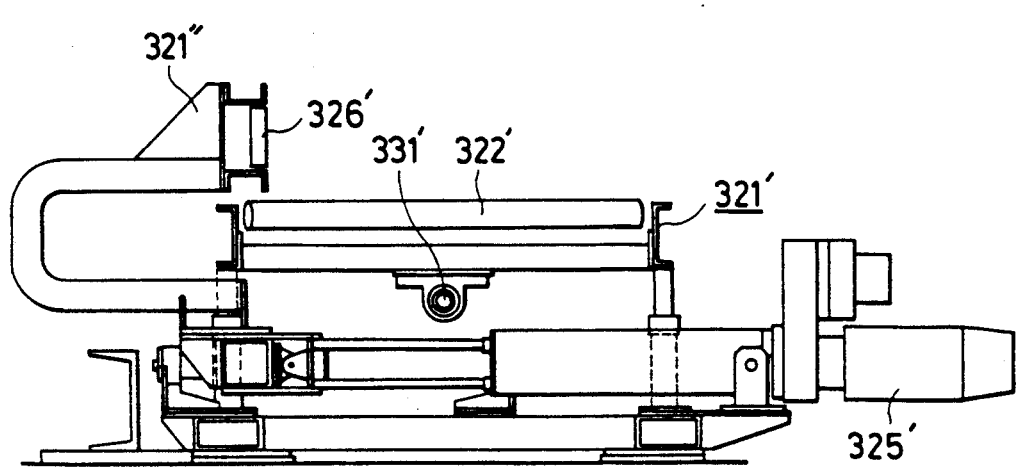
Figure 12:
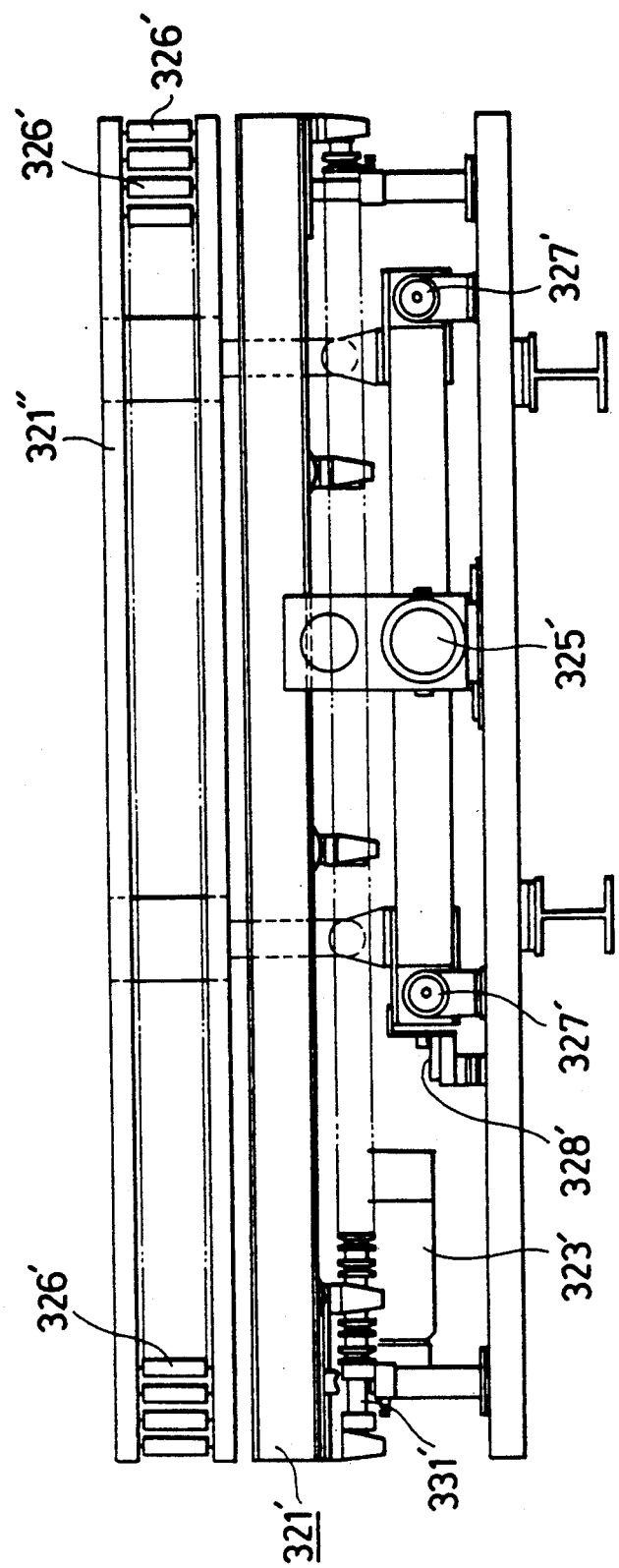

The goods inlet apparatus 32' will be described in greater detail with reference to FIGS. 10 through 12. In these figures, reference numeral 321' denotes a roller conveyor having a plurality of rollers 322' for conveying goods, and 321" denotes a goods guide reciprocally movably disposed in the direction perpendicular to the roller conveyor 321'. In the roller conveyor 321', any of the respective rollers 322' is disposed at angles with respect to the goods guide 321". When the respective rollers 322' are rotated by a motor 323' through a transmission shaft 331', goods (not shown) carried in from the above in FIG. 10, while being caused to move in the right direction in FIG. 10 of the goods guide 321", are carried out downwardly in FIG. 10 and put into a predetermined storing space of the storage facilities A. Further, the goods guide 321" is reciprocally moved in the direction perpendicular to the roller conveyor 321' by the roller conveyor 321" according to sizes of the goods to correct the position of the goods under conveyance. That is, the goods guide 321" is controlled such that the goods guide 321" is driven by a power cylinder 325' having an encorder, the reciprocal movement quantity of the goods guide 321" being detected by measuring the pulse of the encorder, the reciprocal movement of the goods guide 321" being stopped at the time when the detected result agrees with a command signal showing a size of the goods from a computer. Due to the foregoing control, goods conveyed on the roller conveyor 321' are centered according to the sizes thereof and carried in the central portion of a predetermined storing space of the storage facilities A. The goods guide 321" is provided with a plurality of guide rollers 326'. Reference numeral 327' denotes a guide shaft adapted to guide the goods guide 321" in the reciprocally moving direction thereof. Similarly, 328' denotes a limit switch adapted to respectively detect the limit position of the reciprocal movement of the goods guide 321". The limit switch 328' is provided in order to protect this apparatus, and when the limit switch 328' is actuated, this apparatus is suddenly stopped for emergency. Reference numeral 329' denotes a dog for two limit switches. In the roller conveyor 321' of the goods inlet apparatus 32', at least a part of the rollers 322' may be disposed at angles with respect to the direction perpendicular to the goods guide. For example, the rollers positioned in the front and back with respect to the conveying direction may be disposed in the direction perpendicular to the goods guide. Further, instead of the guide roller 326', a slip plate may be provided to the goods guide. Further, it may be arranged as such that the goods guide 321" is driven by a motor including an encorder. On the mounting portion 41' of the truck 4' in the inlet side stacker crane D, a conveyor 42' and a conveyor 43' having a warped configuration for transferring the goods from the goods inlet conveyor E onto the goods transfer conveyor 5' are mounted in a position having the same height as that of the goods inlet conveyor E respectively. A front end portion of the conveyor 43' is disposed in a position adjacent to the marginal portion at the sides of the upper surface of the goods inlet conveyor E. One end of the front end portion is provided with a guide conveyor 43" for guiding the goods to the conveyor 43' in such a posture as to project from the goods inlet conveyor E.

Further, the goods transfer conveyor 5' in the inlet side stacker crane D is pivotably supported at one end thereof by a supporting point 31a' of the lifting section 31' of the crane main body 3' and at the other end thereof by a supporting point 41a' of the mounting portion 41' of the truck 4' at the same height as that of the goods inlet conveyor E, so that the roller conveyor 34' of the crane main body 3' and the conveyor 42' of the truck 4' are connected with respect to each other.

Further, the storage facilities A, as shown in FIG. 3 and FIG. 4, comprise a gravity flow rack having multi-row and multistage storing spaces (storage portions) and a pair of rail frames 1, 1 having a number of rollers are provided to every storing space at angles, so that the goods F, F, . . . placed on the rollers can be moved from the inlet side to the outlet side due to gravity. A storage capable height of the storage portion of the storage facilities A is made large at a stage onto which the goods transfer conveyors 5 and 5' transfer the goods F, F, . . . in a generally horizontal posture and stages in the vicinity of the afore-mentioned stage and small at a stage onto which the goods transfer conveyors 5 and 5' transfer the goods F, F, . . . in an inclined posture and stages in the vicinity of the afore-mentioned stage. More specifically, in this embodiment, the goods transfer conveyors 5, 5', as mentioned before, are provided opposite to a liftable transfer apparatus, i.e., goods outlet apparatus 32 or goods inlet apparatus 32' adapted to transfer the goods to the storage portion. One of the goods transfer conveyors 5 and 5' are associated with the lifting of the transfer apparatuses 32 and 32' and the other ends thereof serving as a pivot center and an oscillation center are disposed in the same height of that of the vicinity of the storage portion at the central stage of the storage facilities A. Accordingly, the storage capable height of the storage portion of the storage facilities A is maximum at the central stage of the storage facilities A and stages in the vicinity thereof, minimum at the uppermost stage and the vicinity thereof and the lowermost stage and the vicinity thereof, intermediate at the intermediate stages thereof. By making the storage capable heights of goods of the storage portions of a stage onto which the goods transfer conveyors 5 and 5' transfer the goods F, F, . . . in a generally horizontal posture and stages in the vicinity thereof large, tall goods F, F, . . . can be stored in these storage portions. Accordingly, if the tall goods F, F, . . . are stored in the storage portions having a large storage capable height, these tall goods F, F, . . . can be generally horizontally transferred. Thus, although the tall goods F, F, . . . are high in the center of gravity in general, they do not fall during transfer. On the other hand, if short goods F, F, . . . are stored in the storage portions of a stage onto which the goods are transferred at angles or in an inclined posture and stages in the vicinity thereof, since such short goods F or F' are low in the center of gravity in general, they do not fall even if they are transferred in an inclined posture. In this embodiment, the storage portion of the storage facilities A is made large in its storage capable width at the downstream side of the outlet conveyor C and upstream side of the goods inlet conveyor E. By setting the storage capable width in this way, generally large sized and large handling quantity of goods F, F, . . . can be stored at the downstream side of the outlet conveyor C and the upstream side of the goods inlet conveyor E, thereby to facilitate the handling of large sized goods. Further, an outlet side end portion of each rail frame 1, as shown in FIG. 8, is provided with a goods holding piece 11 functioning as a stopper for the goods F, F, . . . transferred to an outlet port side. In FIG. 8, reference characters F and F' each denote goods, and the former denotes comparatively large goods, while the latter denotes comparatively small goods.

When the oscillation centers of the goods transfer conveyors 5 and 5' are positioned in for example the lowest stage instead of the generally intermediate height of the storage facilities A as mentioned in the foregoing, it is needless to say that the storage capable height of the storage portion is arranged to be maximum at the lowermost stage and its vicinity of the storage facilities A. Further, if the storage facilities A comprise a gravity flow rack, the rail frame 1 may be provided with a wheel instead of the roller. As a matter of course, the storage facilities A are not necessarily a gravity flow rack. Further, although the storage capable height and the storage capable width of the storage facility are preferably different as mentioned in the foregoing, they may be uniform.

Next, the goods handling method of the present invention will be described by way of embodiments which use a goods handling apparatus shown in FIGS. 1 through 12.

The handling of goods by the afore-mentioned goods handling apparatus is usually started when a request of outlet is placed. That is, when an outlet command signal from a main control apparatus (not shown) is outputted to a stacker crane (not shown) of unit load storage facilities (not shown) provided to the upstream of the depalletizers L-1, L-2 and L-3, the goods F, F, . . . (not shown) stored in the unit load storage facilities are carried out per pallet unit according to the kinds thereof and at the same time, a depallet command signal is outputted to a control board (not shown) of the respective depalletizers L-1, L-2 and L-3, thereby to start the depallet. This depallet signal includes an actuation command (command regarding position of the storage portion in which goods are to be carried, kinds, sizes, number, etc. of goods to be carried in) with respect to the inlet side stacker crane D.

A mode for carrying goods in the storage facilities A and a depalletizing mode, etc. prior to the foregoing will be described first. After the depalletizing is started, the depalletized goods F, F, . . . are conveyed through the respective forward lines K-1, K-2 and K-3 according to the kinds of goods. A desired number of goods F, F, . . . among such depalletized goods F, F, . . . are respectively fed to the storage lines E-1, E-2 and E-3 through the respective gate apparatuses J-1, J-2 and J-3. For example, in FIG. 1, goods of a kind $F_2$ stored in the storage line E-1, goods of a kind $F_3$ stored in the storage line E-2, and goods of a kind $F_4$ are stored in the storage line E-3, respectively.

When the depalletizing is finished (the feeding to the storage lines E-1, E-2 and E-3 is stopped and the gate apparatuses J-1, J-2 and J-3 are switched), an action command signal for the inlet side stacker crane D is outputted from the control board of the respective depalletizers L-1, L-2 and L-3 to a control board (not shown) for controlling a depalletizer and the inlet side stacker crane.

The control board (adapted to allot the merging order and control the goods inlet conveyor E) for controlling the depalletizer and the goods inlet side stacker crane, when any of the three storage lines E-1, E-2 and E-3 is finished (in FIG. 1, storage is finished with respect to the goods of the kind $F_4$), based on a predetermined storage portion arrangement order, in other words, a goods inlet position arrangement order for each kind of goods by the inlet side stacker crane D, of the storage facilities A into which goods of a storage-finished storage line and different kinds of goods now under the storage of other storage lines are to be carried in, a merging order of the respective goods is allotted. Thereafter, an action command is outputted by using, for example, an optical communication to a control apparatus 36' of the inlet side stacker crane D. Thereafter, a merging switch command signal is outputted to the control board (which also controls the storage lines E-1, E-2 and E-3) of the respective depalletizer L-1, L-2 and L-3. Based on this merging switch command signal, the gate of the top of the respective storage lines E-1, E-2 and E-3 is opened and goods are carried onto the goods inlet conveyor E according to the afore-mentioned merging order allotment.

The afore-mentioned merging order allotment is preferably effected with respect to the storage portion, into which the goods are to be carried in, from the upstream side of the goods inlet conveyor E to the downstream side thereof in regular order in view of an efficient goods inlet operation. That is, for example, as shown in FIG. 1, in the case that the kinds of the goods required to be carried in the storage portion of the storage facilities A are $F_2$, $F_3$ and $F_4$, the storage portions for storing the foregoing goods are arranged in this order from the upstream side of the goods inlet conveyor E, the merging order allotment is preferably effected in this order, i.e., $F_2$, $F_3$ and $F_4$. This order allotment is decided at the time when a storage of goods is finished to any one of the storage lines E-1, E-2 and E-3. In one embodiment, the order allotment is not reviewed at the time when the storage is finished in the second and the third storage lines. And, when the merging of the three storage lines E-1, E-2 and E-3 is finished and storage for any one of the following storage lines is finished (sometime, the storage is already finished), the merging order is decided again. At this time, if the inlet side stacker crane D needs to travel more than a certain distance (for example, more than a distance equal to 6 storing spaces of the storage facilities A) toward the upstream side of the goods inlet conveyor E than the present position of the inlet side stacker crane D, it is preferable that the merging is temporarily stopped and after the inlet side stacker crane D arrives at the inlet position opposite to the storage portion into which the goods are to be carried in, the merging is resumed. When the afore-mentioned distance is less than 6 storing spaces, it is preferable that without stopping the merging, the goods already merged and now conveyed by the goods inlet conveyor E are detected by a photo-switch 45' (see FIG. 5 and FIG. 6, wherein a portion equivalent to approximately 6 storing spaces of the storage facility A is projected from the front end of the mounting portion 41' of the truck 4' in the direction of the upstream side of the goods inlet conveyor E) of the inlet side stacker crane D, the goods inlet conveyor E is stopped at the time when the goods arrive at the photo-switch 45' and after the inlet side stacker crane D is caused to travel, the goods inlet conveyor E is driven. Such action of the inlet side stacker crane D is made according to command of the control apparatus 36'. In the case that the inlet side stacker crane D is required to travel more than 6 storing spaces toward the upstream side of the inlet side stacker crane D as mentioned, a merging stop command is outputted from the control apparatus 36' to the control board of the depalletizers L-1, L-2 and L-3. In the case that the afore-mentioned merging order allotment is not effected, even if, for example, the main control apparatus outputs the outlet command signal in the arrangement order of the storage portion of the storage facilities A, due to as possible troubles of the respective depalletizers L-1, L-2 and L-3, far and near of the arrangement, the respective depalletizers L-1, L-2 and L-3 are not driven in synchronism due to the difference of the number of goods to be depalletized, etc., if goods fed to the storage lines E-1, E-2 and E-3 are fed to the goods inlet conveyor E in the order of finish of storage, the goods are not necessarily carried in according to the arrangement order of the storage portion of the storage facilities A. Accordingly, the afore-mentioned merging order allotment is necessary in order to change this order. As a different example of the merging order allotment, the merging order is reviewed every time when storage of any one of the storage lines E-1, E-2 and E-3 is finished.

In the state that the goods F, F, . . . are already stored in the respective storage lines E-1, E-2 and E-3 according to the kinds thereof as mentioned in the foregoing, or are being stored, if a gate for goods F, F, . . . of any of the storage lines, for example, the storage line E-1 is opened in order to carry in the storage facilities A, the goods F, F, . . . of the opened storage line E-1 are conveyed to a front side of the inlet side storing space of the storage facilities A by the goods inlet conveyor E (goods conveying step for inlet of goods). At the front side of the inlet side storing space of the storage facilities A, the inlet side stacker crane D is waiting by placing its vertically and horizontally travellable goods inlet apparatus 32' in a desired storing space of the storage facilities A according to a command of the control apparatus 36'. The goods F, F, . . . carried in by the goods inlet conveyor E are guided from the guide conveyor 43" to the conveyor 43' and then to the conveyor 42' in the waiting inlet side stacker crane D in this order and transferred to the goods inlet apparatus 32' by the goods transfer conveyor 5' via the roller conveyor 34' of the lifting section 31' (goods transferring step for goods inlet). The goods F, F, . . . transferred to the goods inlet apparatus 32' held in the center by the centering guide (goods guide) 321" are correctly fed to the central portion of the appropriate storing space of the storage facilities A by the goods inlet apparatus 32'

(goods inlet step). Goods inlet states by the goods inlet apparatus 32' will be described with reference to FIG. 10 and FIG. 13. When goods are carried in the roller conveyor 321' from above in FIG. 10, about this time, the goods guide 321" are progressed and retreated with respect to the roller conveyor 321' according to the size of such carried-in goods and stopped at a predetermined position. The carried-in goods, while being moved in the direction of the goods guide 321", are conveyed downwardly in FIG. 10. Before being carried out from at least the roller conveyor 321', the goods are corrected in position into the state abutted against the goods guide 321". Then, the goods held in the center are conveyed on the roller conveyor 321' along the goods guide 321" and carried out. That is, as shown in FIG. 13, based on a pre-set central line X for the centering and a reference plane Y, a progress-and retreat position of the goods guide 321" is decided according to a command signal indicating the size of the goods from the computer. Such decision, when a distance of the centering center line X and the reference plane Y is put as Z, is made with respect to goods F having for example a width $W_1$ from a reciprocally moving quantity of $Z - W_1/2$ by measuring the pulse of an encorder.

When the last goods F among goods F, F, . . . from the storage line E-1 are carried in the inlet side stacker crane D, a gate for the next storage line E-2 is opened by a detector. And the goods F, F, . . . of the storage line E-2 are fed to the inlet side stacker crane D by running after the goods F, F, . . . of the storage line E-1 and wait for the time when the goods F, F, . are carried in the storage facilities A.

When the feeding of the goods F, F, . . . from the storage line E-1 to the storage facility A is finished, in the state that the goods F, F, . . . from the storage line E-2 are loaded to the inlet side stacker crane D, the goods inlet apparatus 32' is caused to travel to a storing space in the storage facilities A, into which the goods F, F, . . . are carried in next, due to the horizontal travelling of the inlet side stacker crane D itself or the lifting of the lifting section 31' thereof. The goods F, F, . . . from the storage line E-2 are fed into this storing space. At the same time with the foregoing, the goods F, F, . . . of the storage line E-3 are conveyed by the goods inlet conveyor E and stacked at this side of the guide conveyor 43" of the inlet side stacker crane D, and wait for the time when the goods F, F, . . . are carried in the storage facilities A.

In the afore-mentioned embodiment showing one example of a goods inlet mode, while in the state that the goods F, F, . . . from the next storage line E-2 are loaded on the inlet side stacker crane D, the goods inlet apparatus 32' is caused to travel and after the travel, the goods F, F, . . . from the storage line E-2 are fed. Alternatively, the goods F, F, . . . from the next storage line E-2 may be held on the goods inlet conveyor E for waiting without being loaded to the inlet side stacker crane D and after the goods inlet apparatus 32' is finished travelling or lifting, the goods F, F, . . . from the next storage line E-2 may be fed to the inlet side stacker crane D by means of modification of the control design.

When goods F, F, . . . are to be carried into the gravity flow rack as the storage facilities A, before the goods F, F, . . . are carried therein, it is preferable that the stopper 306 is caused to vertically and horizontally travel along the outlet port side storing space of the gravity flow rack A based on a command from the control apparatus 36 of the outlet side stacker crane B and the stopper 306 is caused to stop in its working state (position shown by the solid line in FIG. 8) at the outlet port side of a predetermined empty storing space of the gravity flow rack A into which the goods F, F, . . . are to be stored. In this case, the stopper 306 is caused to vertically and horizontally travel according to the lifting of the lifting section 31 of the outlet side stacker crane B and the vertical travelling of the outlet side stacker crane B. The working state of the stopper 306 can be obtained by means of actuation of the brake motor 365. Thereafter, the goods F, F, . . . are carried into the storing space, the outlet port side which that stopper 306 is stopped in the working state as mentioned above, by the afore-mentioned inlet side stacker crane D from the inlet port side. The first carried-in goods are moved from the inlet port side to the outlet port side by gravity along the pair of rail frames 1, 1 of the storing space into which the goods are just carried in, and stopped by the stopper 306 in the working state, thereby being prevented from falling or dropping. At this time, shocks given to the stopper 306 by the goods F, F, . . . are absorbed due to torsion of the pivot shaft 363, since the stopper 306 is mounted to the pivot shaft 363. In addition, the shock is also absorbed by a cushion member 368 attached to the surface of the stopper 306.

On the other hand, when the goods F, F, . . . are to be carried out from the storage facilities A, the outlet side stacker crane B is caused to travel in the horizontal direction based on a command from the control apparatus 36 and the lifting section 31 is caused to lift up and down, thereby to bring the goods outlet apparatus 32 to a desired storing space. Thereafter, a desired number of goods F, F, . . . are carried out successively onto the roller conveyor 34 by the goods outlet apparatus 32 from the storing space (goods outlet step). The goods F, F, . . . on the roller conveyor 34 are transferred successively onto the goods outlet conveyor C through the conveyor 42 and the conveyor 43 of the truck 4 by the goods transfer conveyor 5 (goods transfer step for goods carry-out), and such transferred goods F, F, . . . are carried out by the goods outlet conveyor C (goods conveying step for outlet of goods).

When the carrying-out of the goods F, F, . . . from the predetermined storing space in the storage facilities A is finished, while carrying out such carried out goods F, F, . . . onto the goods outlet conveyor C through the goods transfer conveyor 5, the goods outlet apparatus 32 is caused to move to the next storing space and a desired number of goods F, F,.. are carried out from this storing space again.

In the above-mentioned embodiment showing one example of a goods outlet mode, during the travel of the goods outlet apparatus 32 to the next storing space in the storage facilities A, the goods F, F, . . . already carried out from the storage facilities A are transferred onto the goods outlet conveyor C. However, this transfer may be held stopped until the goods outlet apparatus 32 arrives at the next storing space. Further, the outlet side stacker crane B may be caused to travel to a predetermined position (goods delivery position) before the goods outlet apparatus 32 is caused to arrive at the next storing space and the goods F, F, . . . carried out at the predetermined position may be transferred onto the goods outlet conveyor C, and after the transfer is finished, the goods outlet apparatus 32 may be caused to travel to the next storing space to prepare for the next outlet of goods.

When the goods are to be carried out from the storage facilities A, it is needless to say that after the goods outlet apparatus 32 is brought to the outlet port side of a desired storing space of the gravity flow rack A by causing the outlet side stacker crane B to travel in the horizontal direction and the lifting section 31 is caused to lift up and down, while holding the stopper 306 in the released state (position shown by the virtual line in FIG. 8), a desired number of goods F are carried out successively onto the roller conveyor 34 by the goods outlet apparatus 32 from such storing space as just mentioned.

Figure 14A:
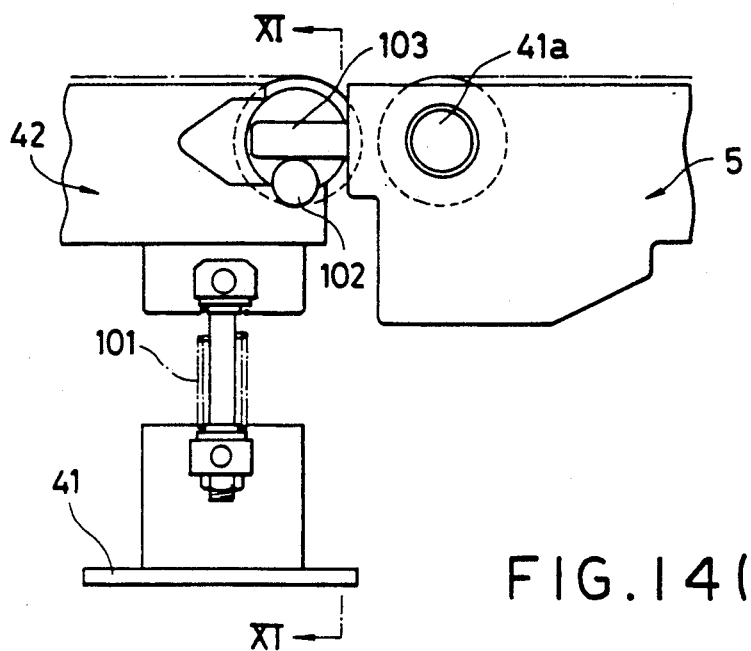
FIG. 14 (A) and (B) are front views showing an important portion picked up from FIG. 3.
Figure 14B:
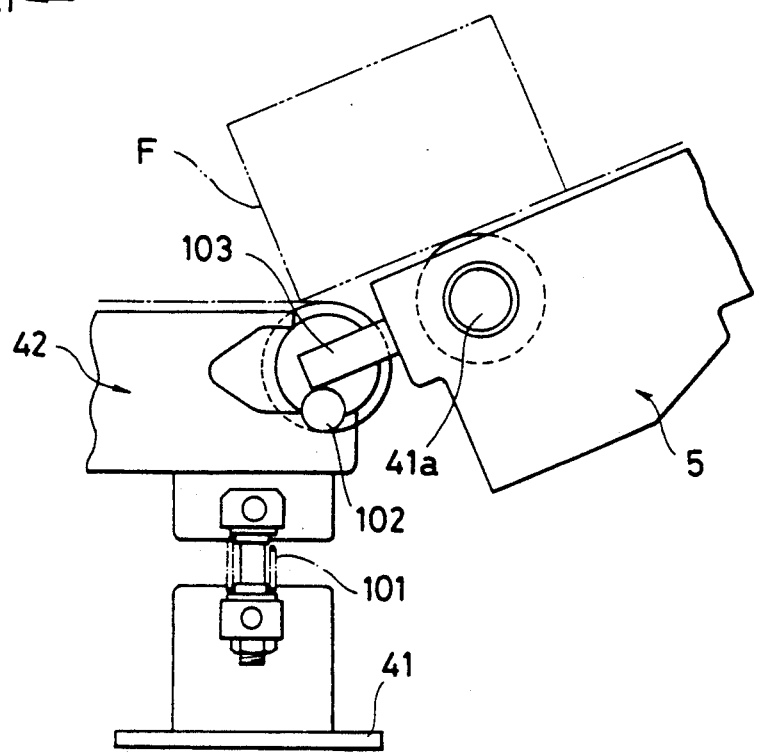
Figure 15:
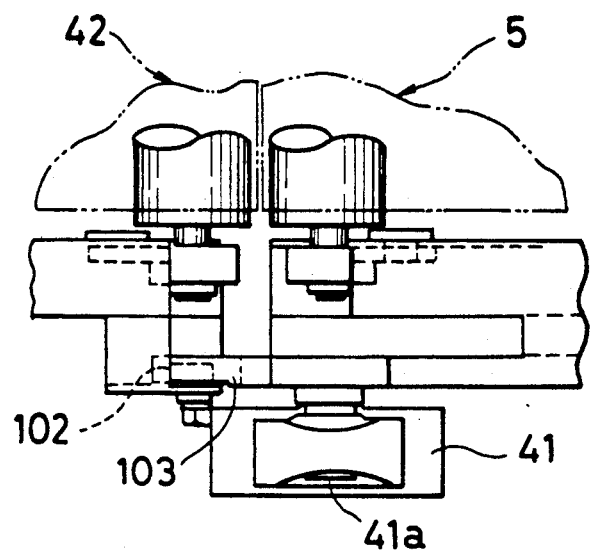
FIG. 15 is a plan view of FIG. 14 (A)
Figure 16:
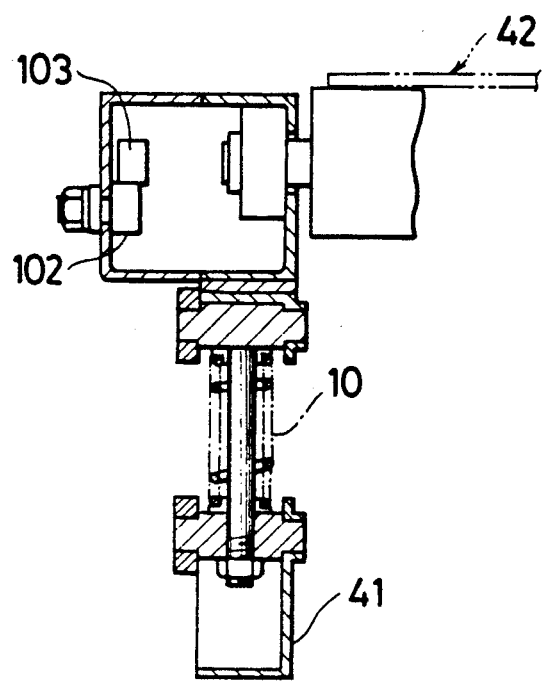
FIG. 16 is an arrow view taken on line XI—XI of FIG. 14 (A)

In the above-mentioned one embodiment of a goods handling apparatus according to the present invention, the goods transfer conveyor 5 functioning as the aforementioned tilt conveyor and the conveyor 42 functioning as the afore-mentioned movable conveyor in the goods outlet side are connected in such a manner as shown in FIG. 14 (A) and (B), FIG. 15 and FIG. 16.

That is, the goods outlet end of the (a) goods transfer conveyor 5 is oscillatably supported by the mounting portion 41 of the truck 4 through the supporting point 41a as described in the foregoing. On the other hand, a movable end of the conveyor 42 connected to the goods outlet end of the (b) goods transfer conveyor 5, under the situation elastically supported upwardly by a resilient spring 101 functioning as an energizing mechanism interposed between the conveyor 42 and the mounting portion 41, is held in such a manner that the bearing roller 102 provided to the frame of the conveyor 42 is pushed downwardly by a push-down piece 103 provided to the goods outlet end of the goods transfer conveyor 5. By this, the movable end of the conveyor 42, when the (1) goods transfer conveyor 5 is held in the horizontal posture as shown in FIG. 14(A) and FIG. 18(A), is set to be in the lifting end level under the state that the resilient spring 101 is expanded to its maximum, and when the (2) goods transfer conveyor 5 is in the downward gradient as shown in FIG. 14 (B) and FIG. 18 (C), it is pushed downwardly by the push-down piece 103 and set to be in a lower level than the lifting end level. The movable end of the conveyor 42, when the (3) goods transfer conveyor 5 is in the upward gradient as shown in FIG. 18 (B), is set to be in the lifting end level under the state that the resilient spring 101 is expanded to its maximum the same as mentioned (1).

A goods outlet operation by using the goods transfer conveyor 5 will be described hereunder with reference to FIG. 18 (A) through (C).

As shown in FIG. 18 (A), when the goods transfer conveyor 5 is held in the horizontal state, goods are smoothly and successively transferred from the upstream side conveyor 34 to the downstream side conveyors 5 and 42, since the respective conveyor planes of the respective conveyors 34, 5 and 42 are disposed on a same plane.

As shown in FIG. 18 (B), when the goods transfer conveyor 5 is held in the upward gradient, the extension plane of the conveyor plane of the upstream side conveyor 34 points onto the conveyor plane of the downstream side conveyor 5, and the extension plane of the conveyor plane of the upstream side conveyor 5 also points onto the conveyor plane of the downstream side conveyor 42. Accordingly, goods are smoothly and successively transferred from the upstream side conveyor 34 onto the downstream side conveyors 5 and 42.

As shown in FIG. 18 (C), when the goods transfer conveyor 5 is held in the downward gradient state, the extension plane of the conveyor plane of the upstream side conveyor 34 points onto the conveyor plane of the downstream side conveyor 5, and goods are smoothly transferred from the upstream side conveyor 34 onto the downstream side conveyor 5. At this time, if the resilient spring 101, the bearing roller 102 and the push-down piece 103 are not provided, the conveyor plane of the upstream side conveyor 5 points to a lower part of the conveyor plane of the downstream side conveyor 42 and collides against the pulley corresponding portion. However, according to the present invention, as described in the foregoing, due to the provision of the resilient spring 101, the bearing roller 102 and the push-down piece 103, a movable end of the conveyor 42 is pushed down. Accordingly, the conveyor plane of the upstream side conveyor 5 also points onto the conveyor plane of the downstream side conveyor 42 and goods are smoothly transferred from the upstream side conveyor 5 onto the downstream side conveyor 42.

Figure 17A:
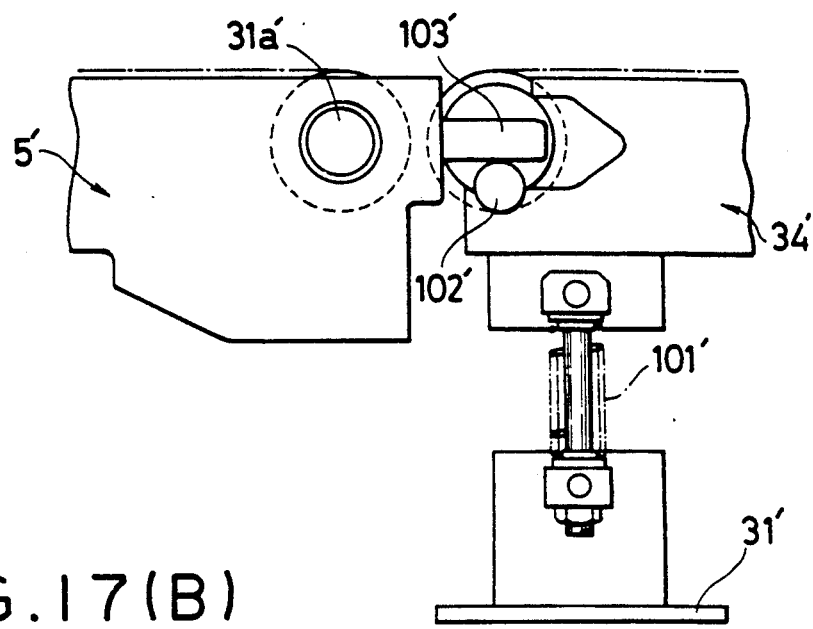
FIG. 17 (A) and (B) are front views showing an important portion picked up from FIG. 6.
Figure 17B:
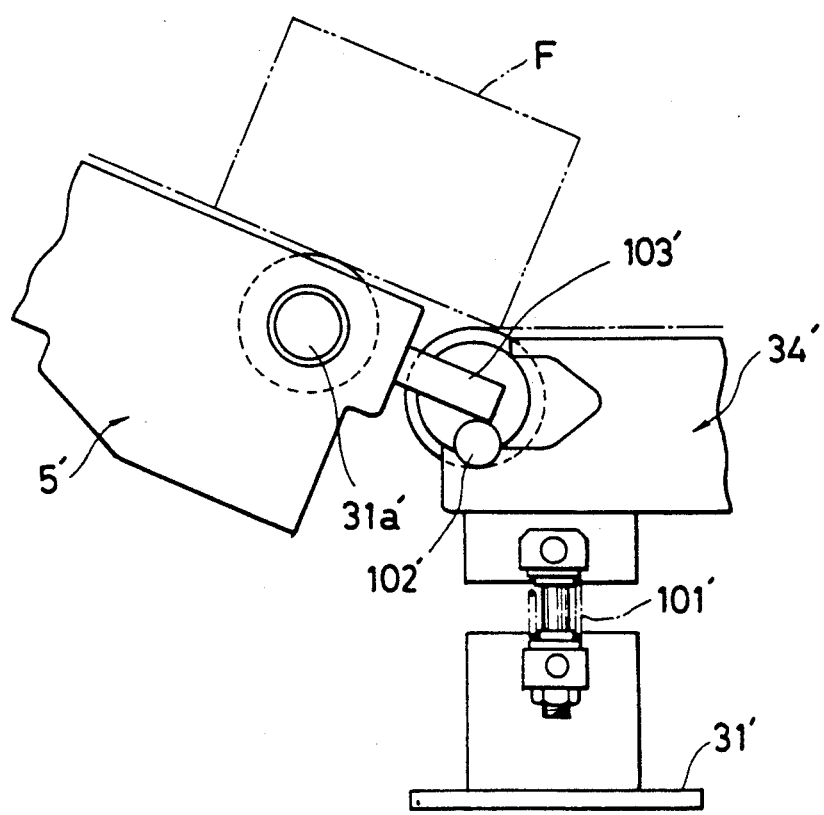
Figure 19A:
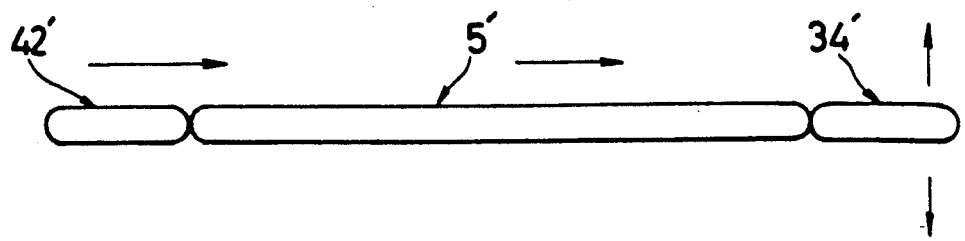
FIG. 19 (A), (B), (C) and (D) are pictorial views showing actuation states of the important portion of FIG. 6.
Figure 19B:
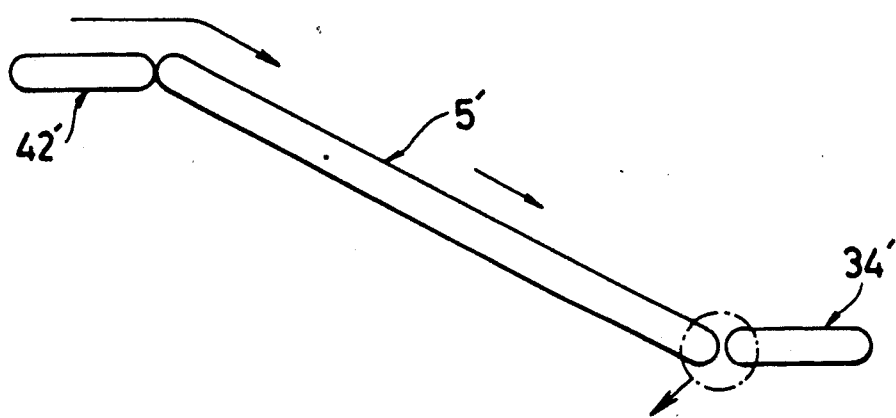
Figure 19D:
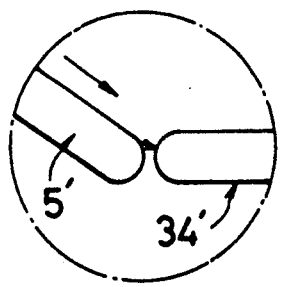
Figure 19C:
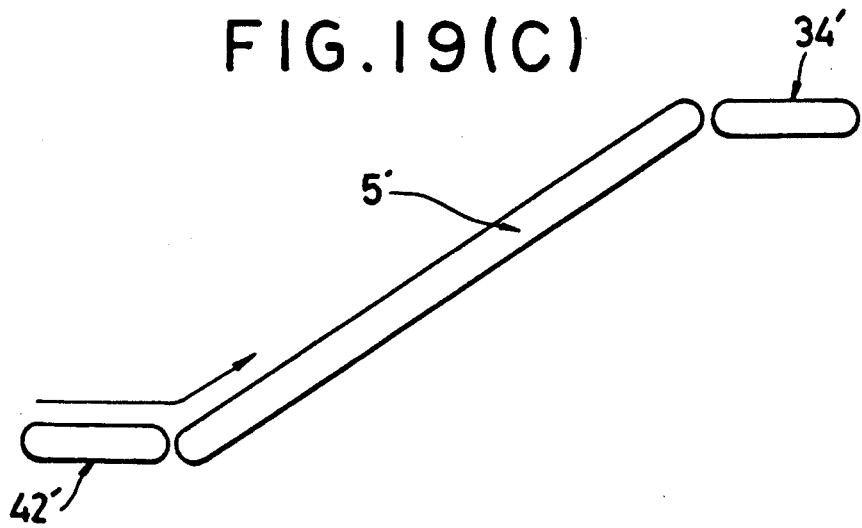

Further, in one embodiment of the goods handling apparatus according to the present invention, the goods transfer conveyor 5' functioning as the afore-mentioned tilt conveyor and the conveyor 34' functioning as the afore-mentioned movable conveyor in the goods inlet side are connected in the same manner as that of the goods outlet side as shown in FIG. 17 (A) and (B). Reference numeral 101' denotes a resilient spring, 102' denotes a bearing roller and 103' denotes a push-down piece.

A goods inlet operation by using the goods transfer conveyor 5' will be described hereunder with reference to FIG. 19 (A) through (C).

As shown in FIG. 19 (A), when the goods transfer conveyor 5' is held in the horizontal state, since the respective conveyor planes of the conveyors 42', 5' and 34' are disposed in generally the same plane, goods are smoothly and successively transferred from the upstream side conveyor 42' onto the downstream side conveyors 5' and 34'.

As shown in FIG. 19 (B), when the goods transfer conveyor 5' is set to be a downward gradient, the extension plane of the conveyor plane of the upstream side conveyor 42' points onto the conveyor plane of the downstream side conveyor 5' and goods are smoothly transferred from the upstream side conveyor 42' onto the downstream side conveyor 5'. At this time, if the resilient spring 101', the bearing roller 102' and the push-down piece 103' are not provided, the extension plane of the conveyor plane of the upstream side conveyor 5' points to a lower part of the conveyor plane of the downstream side conveyor 34' and collides against a pulley corresponding portion. However, in the present invention, as described in the foregoing, due to the provision of the resilient spring 101', the bearing roller 102' and the push-down piece 103', since the movable end of the conveyor 34' is pushed down, the extension plane of the conveyor plane of the upstream side conveyor 5' also points onto the conveyor plane of the downstream side conveyor 34' and goods are smoothly transferred from the upstream side conveyor 5' onto the downstream side conveyor 34'.

As shown in FIG. 19 (C), when the goods transfer conveyor 5' is set to be in an upward gradient state, since the extension plane of the conveyor plane of the upstream side conveyor 42' points onto the conveyor plane of the downstream side conveyor 5', and the extension plane of the conveyor plane of the upstream side conveyor 5' also points onto the conveyor plane of the downstream side conveyor 34', goods are smoothly and successively transferred from the upstream side conveyor 42' onto the downstream side conveyors 5' and 34'.

FIG. 20 illustrates another embodiment of the outlet side stacker crane B. In this figure, the stacker crane B is constructed in the same manner as the outlet side stacker crane B shown in FIG. 2, FIG. 3 and FIG. 4 except that the truck 4 is not supported by the upper rail 21 and the truck 4 is allowed to travel only on the lower rail 22, and between the crane main body 3 and the truck 4, a connecting rod 51 which constitutes a link mechanism together with the goods transfer conveyor 5 and both ends of which are pivotably supported by the crane main body 3 and the truck 4 is interposed, thereby to prevent the truck 4 from falling in the travelling direction of the truck 4, and one side portion of the front end portion of the conveyor 43 is provided with a guide conveyor 44 instead of the free guide roller.

Although not shown in the figures, the inlet side stacker crane D may take the same construction as that which is shown in FIG. 20. In connection with FIG. 20, the crane main bodies 3 and 3' of the inlet side and the outlet side stacker cranes D and B may be constructed differently from those shown in FIG. 2, FIG. 3 and FIG. 4. Instead, they may comprise a truck attached lift travelling on the lower rail 22, or otherwise a suspension type crane travelling on the upper rail 21.

FIG. 21 illustrates another embodiment of a goods handling apparatus according to the present invention. In this embodiment, the stacker crane is formed in an inlet and outlet type. That is, the inlet and outlet type stacker crane G is movable between a pair of storage facilities A, A, the lifting section 31 of the crane main body 3 being provided with a goods inlet and outlet apparatus (liftable transfer apparatus) 37, the goods inlet and outlet apparatus 37 being connected to a goods carrier conveyor H through the goods transfer conveyor 5. The goods inlet and outlet apparatus 37 chiefly comprises picking apparatuses 37a and 37b disposed opposite to the storage facilities A, A respectively. The goods inlet and outlet apparatus 37 also includes a roller conveyor 38 disposed between the picking apparatuses 37a and 37b, and a pusher 39 disposed in a position opposite to the goods transfer conveyor 5 with the roller conveyor 38 held therebetween, a stopper 38b of a goods picked up by one picking apparatus 37b being disappearably disposed between the rollers of the roller conveyor 38 near the other picking apparatus 37a or a stopper 38a of goods picked up by the other picking apparatus 37a being disappearably disposed between the rollers of the roller conveyor 38 near one picking apparatus 37b. Thus, according to the stacker crane of FIG. 21, storing goods can be picked up from both of the storage facilities A, A by the picking apparatuses 37a and 37b. Such picked-up goods are stopped by the stopper 38a or 38b, then pushed out onto the goods transfer conveyor 5 by the pusher 39 and thereafter carried out by the carrier conveyor H. When the goods are to be carried in, the pusher 39 can function as a centering guide of the goods, the goods transferred from the goods carrier conveyor H onto the roller conveyor 38 by the goods transfer conveyor 5 can be fed into any of the storage facilities A, A by reversely rotating a pair of expandable tilt conveyors 37a' and 37b' of the picking apparatuses 37a and 37b. On the other hand, if one picking apparatus 37a is reversely rotated so as to function as an inlet apparatus, and the other picking apparatus 37b is normally rotated so as to function, as an outlet apparatus, goods can also be transferred from one storage facility A to the other storage facility A. The storage facilities A, A in this embodiment are formed as a usual stationary shelf instead of a gravity flow rack. Further, the goods carrier conveyor H may suffice, even if it does not extend so far as the end portions of the storage facilities A, A as shown in the figure.

Figure 23:
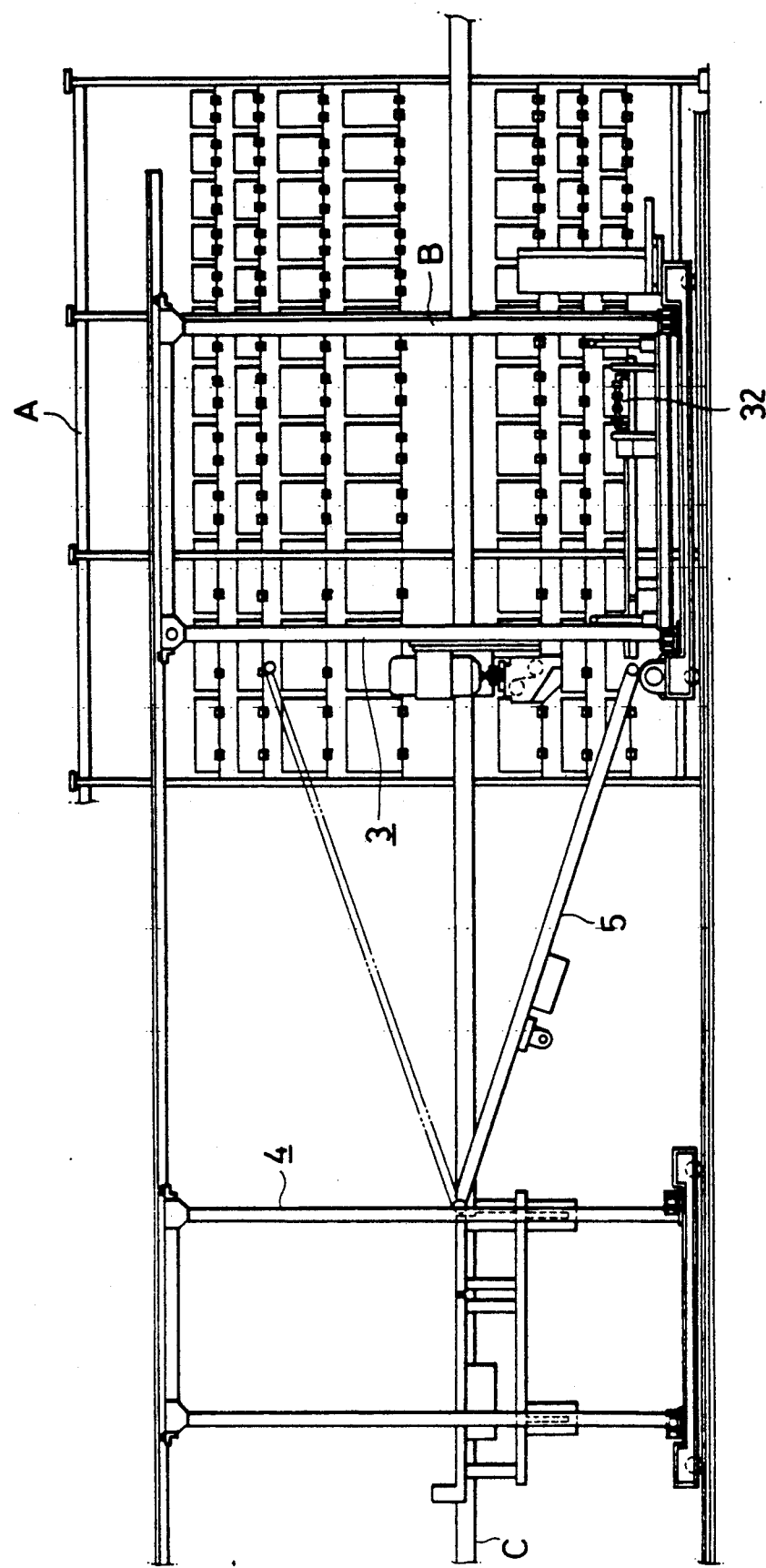
FIG. 23 is a front view of an outlet side apparatus according to still a further embodiment of the present invention.

FIG. 22 illustrates still another embodiment of a goods handling apparatus according to the present invention. The goods handling apparatus in this embodiment, different from the embodiment of FIG. 1, is constructed such that the inlet side stacker crane D and the outlet side stacker crane B are caused to travel the outside of the goods inlet conveyor E and the goods outlet conveyor C respectively. In this embodiment, as shown in FIG. 23, a stage of the storage facilities A corresponding to the heights of the goods outlet conveyor C and the goods inlet conveyor E (not shown in FIG. 23) is preferably left as a dead space, since goods are difficult to be taken out by the goods outlet apparatus 32 and difficult to be fed by the goods inlet apparatus (not shown in FIG. 22 and FIG. 23). Further, the goods inlet apparatus in this embodiment is preferably expandable as same as the picking apparatus constituting the goods outlet apparatus 32.

Figure 24:
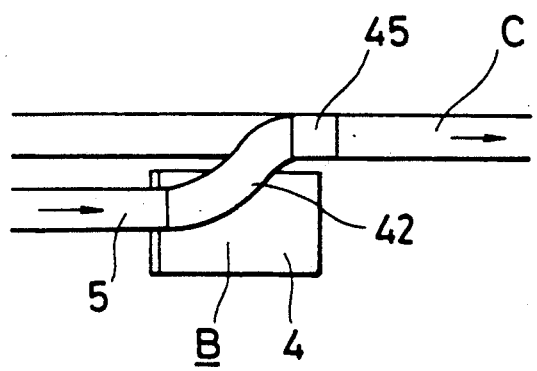
FIG. 24 and FIG. 25 respectively are a plan view and a front view showing transfer portions for transferring goods from other transfer conveyors to a goods outlet conveyor.
Figure 25:
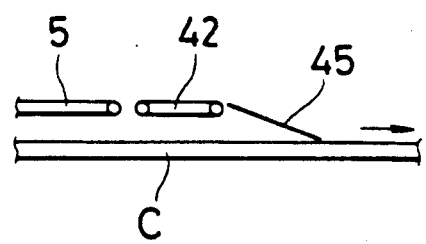

FIG. 24 and FIG. 25 illustrate another example of a goods transfer portion, in which goods are transferred from the goods transfer conveyor 5 of the goods outlet side stacker crane B to the goods outlet conveyor C. The illustrated transfer portion is constituted such that the front end portion of the conveyor 42 of the truck 4 is provided with a chute 45 instead of the conveyor 43 of FIG. 2 and FIG. 3 projecting above the goods outlet conveyor C. This transfer portion may be constructed as such that the conveyor 42 of the truck 4 projects above the goods outlet conveyor C.

Figure 26:
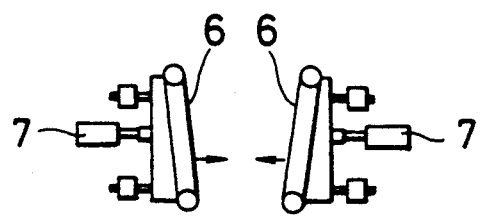
FIG. 26 and FIG. 27 respectively are a plan view and a front view showing other centering mechanisms of inlet apparatuses.
Figure 27:
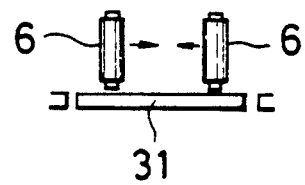

FIG. 26 and FIG. 27 illustrate another centering structure in the inlet apparatus 32'. The illustrated centering structure is arranged so that goods are centered from both sides thereof by a pair of conveyors 6, 6 instead of the centering guide 321'' for centering goods from one side thereof as shown in FIG. 5 and FIG. 6. That is, the pair of conveyors 6, 6 are varied in the space and center the goods from both sides thereof by the control cylinders 7, 7 which are actuated according to a control information command sent from a computer on the ground such as goods feed number, goods feed address (storing space of the storage facilities A into which goods are to be fed) and goods width, etc.

FIG. 28 illustrates a schematic plan view showing yet a further embodiment of a goods handling apparatus according to the present invention. In this embodiment, the outside of the travelling plane of the outlet side stacker crane B is provided with multistage goods outlet conveyors C-1, C-2 and C-3, and the outside of the travelling plane of the inlet side stacker crane D is provided with multistage goods inlet conveyors E'-1, E'-2 and E'-3. Arrangements being as such that desired kinds of goods F, F, ... are carried into the storage facilities A from the goods inlet conveyors E'-1, E'-2 and E'-3 of a desired stage through the waiting inlet side stacker crane D. At the same time, desired kinds of goods F, F, ... within the storage facilities A are carried out by the outlet side stacker crane B and carried out by the goods outlet conveyor C-1, C-2 or C-3 of a desired stage.

The features of the above-mentioned embodiment will be described hereunder with reference to FIGS. 28 through 30. The goods outlet conveyors C-1, C-2 and C-3 and the goods inlet conveyors E'-1, E'-2 and E'-3 respectively are located at the outside of the travelling planes of the outlet side stacker crane B and the inlet side stacker crane D of the storage facilities A and disposed at generally the same height of the central storing space and its vicinity of the central stage of the storage facilities A in three stages generally parallel with one another. The goods inlet conveyors E'-1, E'-2 and E'-3 are rotatable in the normal and the reverse directions and convey goods F, F fed from the inlet side line (not shown) to a suitable position. The truck 4 in the outlet side stacker crane B is provided with a lifting section 241 which is lifted up and down between the uppermost stage of the goods outlet conveyor C-1 and the lowermost stage of the good outlet conveyor C-3 driven by a lifting section drive apparatus 240. The lifting section 241 is provided with a conveyor 42 and a warped conveyor 43 adapted to carry out goods F from the goods transfer conveyor 5 onto a goods outlet conveyor C-1, C-2 or C-3 of a desired stage (plane positional relation of these coveyors is same as FIG. 2). The goods transfer conveyor 5 in the outlet side stacker crane B is pivotably supported at one end thereof by the supporting point 31a of the lifting section 31 of the crane main body 3 and the other end thereof by the supporting portion 241a of the lifting section 241 of the truck 4 in such a manner as to connect the roller conveyor 34 of the crane main body 3 and the conveyor 42 of the truck 4.

Further, the truck 4' in the inlet side stacker crane D is provided with a lifting section 241' which is caused to lift up and down between the uppermost stage of the goods inlet conveyor E'-1 and the lowermost stage of the goods inlet conveyor E'-3 driven by a lifting section drive apparatus 240'. This lifting section 241' is provided with a warped conveyor 43' and a conveyor 42' for transferring goods from a desired stage of the goods inlet conveyors E'-1, E'-2 and E'-3 onto the goods transfer conveyor 5' in order (plane positional relation of these conveyors is same as FIG. 5). And, the front end portion of the conveyor 43' is disposed adjacent to the side marginal portions of the goods inlet conveyors E'-1, E'-2 and E'-3. One end portion of such front end portion is provided with a guide conveyor 43" adapted to smoothly guide goods onto the conveyor 43' and being retreatably projected from a desired stage of the goods inlet conveyors E'-1, E'-2 and E'-3 by suitable means. Further, the goods transfer conveyor 5' in the inlet side stacker crane D is pivotably supported at one end thereof by the supporting point 31a' of the lifting section 31' of the crane main body 3' and the other end thereof by the supporting point 241a' of the lifting section 241' of the truck 4' in such a manner to connect the roller conveyor 34' of the crane main body 3' and the conveyor 42' of the truck 4'.

In FIGS. 28 through 30, reference numerals not used in the above description denote identical members, apparatuses, etc. denoted by reference numerals of FIG. 1, FIG. 3 and FIG. 6.

A goods handling method by the above-mentioned embodiment is performed generally in the same manner as the aformentioned mode wherein the goods handling apparatus shown in FIGS. 1 through 19 is used.

For example, the inlet mode can be performed in the same manner as the afore-mentioned mode, wherein the conveyor 43' of the truck 4' is positioned in the height as the desired stage of the goods inlet conveyors E'-1, E'-2 and E'-3 into which goods F, F, . . . of the kind to be fed to the storage facilities A and remaining in the state that the guide conveyor 43" of its front end portion is held projecting therefrom. The goods inlet operation for the next kind of goods can be performed in the following manner. That is, at the time when the last good F of the goods F, F, . . . from the goods inlet conveyor E'-1, E'-2 and E'-3 of the first desired stage is carried in the inlet side stacker crane D, the guide conveyor 43" is caused to retreat from the first desired stage of the goods inlet conveyors E'-1, E'-2 and E'-3 by a detector which confirmed this, the lifting section 241' of the truck 4' is caused to lift to a position of the same height with respect to the desired stage of the goods inlet conveyors E'-1, E'-2 and E'-3, the guide conveyor 43" is caused to project above the next desired stage of the goods inlet conveyors E'-1, E'-2 and E'-3 again, and the goods F, F, . . . of the next desired stage of the goods inlet conveyors E'-1, E'-2 and E'-3 are fed to the inlet side stacker crane D in such a manner as to run after the goods F, F, . . . from the first desired stage of the goods inlet conveyors E'-1, E'-2 and E'-3.

At the time when the feeding of the goods F, F, . . . from the first desired stage of the goods inlet conveyors E'-1, E'-2 and E'-3 to the storage facilities A is finished, in the state that the goods F, F, . . . from the next desired stage of the goods inlet conveyors E'-1, E'-2 and E'-3 are loaded on the inlet side stacker crane D, the goods inlet apparatus 32' is caused to travel to the storing space in the storage facilities A into which goods are carried in next due to the traveling of the inlet side stacker crane itself in the horizontal direction or the lifting of the lifting section 31' and the goods F, F, . . . from the next desired stage of the goods inlet conveyors E'-1, E'-2 and E'-3 are fed into this storing space.

In the case of the above-mentioned inlet mode, when the inlet side stacker crane D travels to the upstream side of the goods inlet conveyors E'-1, E'-2 and E'-3, it is preferable that the next desired stage of the goods inlet conveyors E'-1, E'-2 and E'-3 is caused to rotate reversely, and the goods F, F, . . . of the next desired stage of the goods inlet conveyors E'-1, E'-2 and E'-3 are transferred to the upstream side according to the travelling of the inlet side stacker crane D.

On the other hand, it will be easily understood that if the outlet of the goods F, F, . . . from the storage facilities A is positioned in the same height with respect to the desired stage of the goods outlet conveyors C-1, C-2 and C-3 due to the lifting of the lifting section 241 of the truck 4, it can be performed generally in the same manner as the afore-mentioned inlet mode.

Needless to say, the embodiment of the goods handling apparatus according to the present invention shown in FIGS. 28 through 30 can be applied with a similar modification to those shown in FIGS. 20 through 27 which are applied to the embodiment of the goods handling apparatus according to the present invention shown in FIGS. 1 through 19.

The features of the modes and the embodiments of the goods handling method and the apparatus thereof according to the present invention will be listed as follows.

(1) Since the goods carrier conveyors such as the goods inlet conveyor E, goods outlet conveyor C, etc. are not disposed on the travelling path of the stacker crane such as the inlet side stacker crane D, the outlet side stacker crane B, etc. but juxtaposed to the travelling path of the stacker crane, and in addition, the goods carrier conveyors can be disposed to the intermediate level of the storage facilities, the goods transfer conveyor can be used by inclining in such state as upward gradient, horizontal gradient, downward gradient, etc., and the total length of the stacker crane can be made short, thereby to minimize the dead space.

(2) Since the goods transfer conveyor and the goods carrier conveyor are separate bodies with respect to each other, they can be separately actuated, stopped or speed controlled, thereby enabling wide control of the inlet and the outlet of goods.

(3) The goods outlet end of the goods transfer conveyor as the tilt conveyor can be located in a position lower than the goods inlet end thereof, so that goods can be conveyed downward from the goods inlet end of the goods transfer conveyor, and the gradient of the goods transfer conveyor can be made comparatively small without making the length of the goods transfer conveyor long.

(4) When the goods transfer conveyor as the tilt conveyor conveys goods in the downward gradient state, the movable end of the movable conveyor disposed at the goods outlet side of the goods transfer conveyor is pushed down resisting the force of the energizing mechanism adapted to return the movable conveyor to its initial position. Accordingly, when the upstream side tilt conveyor is connected to the downstream side movable conveyor in the downward gradient, the extension plane of the conveyor plane of the upstream side tilt conveyor does not point at a lower level of the conveyor plane of the downstream side movable conveyor and always points at an upper level of the conveyor plane of the downstream side movable conveyor. Thus, goods can be surely and smoothly transferred from the upstream side tilt conveyor to the downstream side movable conveyor.

(5) After goods are taken out from a desired storing space of the storage facilities, the goods are merely transferred onto the goods carrier conveyor through the goods transfer conveyor. Thus, a simple and highly efficient outlet is obtainable. Further, even if the stacker crane is travelling, the goods already taken out from the storage facilities and loaded on the goods transfer conveyor can be transferred onto the goods carrier conveyor. Thus, an efficient outlet is obtainable.

(6) Inlet of goods into the storage facilities can be effected in such a simple manner that the goods sent from the goods carrier conveyor are directly received by the goods transfer conveyor and then simply transferred onto the inlet apparatus.

(7) Heretofore, the inlet and outlet are usually effected by having the stacker crane reciprocally travel between the loading station and the storing space of the storage facilities. Accordingly, the stacker crane is always required to travel one way in an unloaded state, which results in poor efficiency. In addition, since the forward and backward distance of the stacker crane is long, much time is wasted. However, in the present invention, the goods carrier conveyor is always provided to the side of the travelling plane of the stacker crane and the goods carrier conveyor can be used as a substitute for the loading station. Thus, the stacker crane is not required to travel between the loading station and the storing space of the storage facilities. In other words, in the present invention, the goods carrier conveyor is used as a moving loading station and irrespective of the travel of the stacker crane, goods can be fed to the vicinity of the stacker crane according to, for example, the kinds of goods.

(8) In the case that a multistage goods carrier conveyor is provided, a gate from a plurality of lines is not required. Goods can be directly carried in the storage facilities from the plurality of lines through the multistage goods carrier conveyor and carried out to the plurality of lines from the storage facilities through the multistage good carrier conveyor.

(9) When the multistage carrier conveyor is provided, since desired goods can be carried out to a desired stage of the goods carrier conveyor, when the goods are carried out from the goods carrier conveyor to the plurality of lines, the goods are not required to be selected as in the case in which one stage goods carrier conveyor is provided.

(10) The goods inlet apparatus is arranged such that the goods guide is reciprocally moved in the direction perpendicular to the roller conveyor according to the sizes of goods and the position of goods conveyed on the roller conveyor along the goods guide while being moved in the goods guide direction. Thus, various sized-and various kinds of goods can be centered according to the sizes and the goods can be correctly carried in a predetermined storing space of the storage facilities.

(11) When storage is finished with respect to any one of a plurality of storage lines, between the storage lines, a goods merging order allotment is made according to the arrangement order of the inlet side stacker crane with respect to the respective goods, and according to the merging order allotment, the goods are merged onto the goods inlet conveyor. Thus, the goods can be carried in the storage facilities efficiently, promptly, successively and without receiving an adverse affection from the depalletizer which is upstream equipment with respect to the storage line.

(12) Since the storage capable height of the storage section of the storage facilities is varied in relation to the goods transfer conveyor, when goods are carried in and carried out from the storage facilities, the goods can be efficiently, promptly and successively handled without permitting the goods to fall down.

(13) Since a stopper is vertically and horizontally travellably disposed to an outlet side storing space of a gravity flow rack as storage facilities, no braking devices, etc. are required to the respective storing spaces of the gravity flow rack and the goods carried in can be surely held. As a result, inlet of goods, particularly inlet of goods for an initial feeding can be efficiently and safely effected with respect to the multirow and multistage gravity flow rack.

While specific embodiments of the present invention have been shown and described in detail to illustrate the application of the principles of the present invention, it will be understood that the present invention may be embodied otherwise without departing from such principles. For example, a goods handling method and an apparatus thereof according to the present invention may be applied to either one of inlet and outlet with respect to the storage facilities. Further, it is also applicable to inlet or outlet of a single kind of goods. At any rate, the present invention is not limited to the abovementioned modes and embodiments.

What is claimed is:

1. A goods handling apparatus for carrying in goods with respect to storage facilities having multirow and multistage storing spaces, said apparatus including a goods inlet apparatus adapted to carrying in goods by travelling in a vertical direction and in a horizontal direction along said storing spaces of said storage facilities, a goods carrier conveyor adapted to convey the goods within a plane parallel to a travelling plane of said goods inlet apparatus, a goods transfer conveyor adapted to connect said goods inlet apparatus to said goods carrier conveyor, said inlet apparatus being placed on a lifting section of a stacker crane which is movable in the horizontal direction along the storing spaces of said storage facilities, said goods transfer conveyor having a first end oscillatably mounted to said stacker crane for movement according to the lifting of said lifting section, and a second end thereof is positioned at the same height as said goods carrier conveyor, said goods carrier conveyor is disposed generally horizontally and generally the height of a storing space of a central stage located at an intermediate height level of the storage facilities,

- a movable conveyor located between said first end of said goods transfer conveyor and said inlet apparatus to receive goods from said first end of said goods transfer conveyor and transmit them to said inlet apparatus,
- said first end of said goods transfer conveyor being engaged with a vertically movable end of said movable conveyor,
- said vertically movable end of said movable conveyor being supported by resilient means for movement to a second position, said resilient means returning said movable conveyor to its initial position after the passage of goods, and
- said first end of said goods transfer conveyor and said movable conveyor being mounted on said lifting section so that due to the lifting of said lifting section, said goods transfer conveyor is oscillated about said first end.

2. A goods handling apparatus according to claim 1, wherein said storing spaces adjacent said horizontal plane of said goods carrier conveyor have a greater height than those storing spaces spaced further, in a vertical direction, from said horizontal plane.

3. A goods handling apparatus for carrying out goods with respect to storage facilities having multirow and multistage storing spaces,

- said apparatus including a goods outlet apparatus adapted to carrying out goods by travelling in a vertical direction and in a horizontal direction along storing spaces of said storage facilities,
- a goods carrier conveyor adapted to convey the goods within a plane parallel to a travelling plane of said goods outlet apparatus,
- and a goods transfer conveyor adapted to connect said goods outlet apparatus to said goods carrier conveyor,
- said outlet apparatus being placed on a lifting section of a stacker crane which is movable in the horizontal direction along the storing spaces of said storage facilities,
- said goods transfer conveyor having a first end oscillatably mounted to said stacker crane for movement according to the lifting of said lifting section, and a second end thereof is positioned at the same height as said goods carrier conveyor,
- said goods carrier conveyor is disposed generally in a horizontal plane and generally at the height of a storing space of a central stage located at an intermediate height level of the storage facilities,
- a movable conveyor located between said second end of said goods transfer conveyor and said goods carrier conveyor to receive goods from said second end of said goods transfer conveyor and transmit them to said goods carrier conveyor,
- said second end of said goods transfer conveyor being engaged with a vertically movable end of said movable conveyor,
- said vertically movable end of said movable conveyor being supported by resilient means for movement to a second position, said resilient means returning said movable conveyor to its initial position after the passage of goods, and
- said first end of said goods transfer conveyor being mounted on said lifting section so that due to the lifting of said lifting section, said goods transfer conveyor is oscillated about said first end.

4. A goods handling apparatus according to claim 3, wherein said storing spaces adjacent said horizontal plane of said goods carrier conveyor means have a greater height than those storing spaces spaced further, in a vertical direction, from said horizontal plane.

* * * * *